(12) United States Patent
Shang et al.

(10) Patent No.: US 12,149,628 B2
(45) Date of Patent: Nov. 19, 2024

(54) SELF-AUTHORIZING IDENTIFICATION AND APPLICATIONS THEREFOR

(71) Applicant: SHALIBARON CORPORATION, San Ramon, CA (US)

(72) Inventors: Heping Shang, Walnut Creek, CA (US); James Qiu, San Ramon, CA (US)

(73) Assignee: SHALIBARON CORPORATION, San Ramon, CA (US)

( * ) Notice: Subject to any disclaimer, the term of this patent is extended or adjusted under 35 U.S.C. 154(b) by 3 days.

(21) Appl. No.: 18/001,628

(22) PCT Filed: Aug. 19, 2021

(86) PCT No.: PCT/US2021/046638
§ 371 (c)(1),
(2) Date: Dec. 13, 2022

(87) PCT Pub. No.: WO2022/040396
PCT Pub. Date: Feb. 24, 2022

(65) Prior Publication Data
US 2023/0224161 A1 Jul. 13, 2023

Related U.S. Application Data

(60) Provisional application No. 63/068,784, filed on Aug. 21, 2020.

(51) Int. Cl.
*H04L 9/32* (2006.01)
*H04L 9/30* (2006.01)

(52) U.S. Cl.
CPC .......... *H04L 9/3236* (2013.01); *H04L 9/3073* (2013.01)

(58) Field of Classification Search
USPC ....................................................... 713/150
See application file for complete search history.

(56) References Cited

U.S. PATENT DOCUMENTS

| | | | | |
|---|---|---|---|---|
| 10,938,567 | B2 * | 3/2021 | Martino | ............... G06Q 20/065 |
| 2018/0343126 | A1 * | 11/2018 | Fallah | .................. H04L 9/3297 |
| 2019/0230073 | A1 | 7/2019 | Patel et al. | |

FOREIGN PATENT DOCUMENTS

| | | | |
|---|---|---|---|
| CN | 109831298 A | 5/2019 | |
| WO | WO-2018142291 A1 * | 8/2018 | ......... H04L 63/0428 |
| WO | 2020134942 A1 | 7/2020 | |

OTHER PUBLICATIONS

International Search Report and Written Opinion for PCT/US2021/046638 mailed Nov. 9, 2021.

(Continued)

*Primary Examiner* — Brandon Hoffman
(74) *Attorney, Agent, or Firm* — Perilla Knox & Hildebrandt LLP; Kenneth A. Knox

(57) ABSTRACT

Various embodiments are disclosed for self-authorized identification and services, and applications therefor. A computing device may generate a public-private key pair and a self-authorizing identifier (SAID), a byte string that is globally unique and immutable to the computing device. A remote service implementing a blockchain protocol may store a public key of the public-private key pair in a distributed blockchain ledger, which is used to authenticate the computing device in various network-based communications, and encrypt or decrypt such communications. An enclave service may be employed to asynchronously send messages between computing devices. The computing device may have an isolated environment that permits collaboration applications to execute therein, as well as an actallet that permits distribution applications not executing in the isolated environment to access the SAID or data pertaining thereto.

31 Claims, 12 Drawing Sheets

(56) References Cited

OTHER PUBLICATIONS

International Preliminary Report on Patentability for PCT/US2021/046638 completed Jul. 18, 2022.
Search Report for European Application No. 21859116.2 mailed Sep. 9, 2024.

* cited by examiner

Identity Terminology

| Term | Description |
| --- | --- |
| DSI | Decentralized System Interconnection is an architecture reference model for building a DSI network. |
| DSI Data | DSI predefined data object. It can be stored, transmitted, parsed, and understood by all DSI components. |
| DataUri | DSI data URI. It is a globally unique, unguessable, 20-bytes string. |
| SchemaId | DSI data schema identifier. |
| DsiBuf | DSI data representation standard, a Google® protocol buffer serialized DSI data. |
| DsiAny | DsiBuf with a Schema Id and an encryption indicator. DSI requires data on-disk or on-transportation in DsiAny format. |
| SAID | Self-Authorized ID, a globally unique, immutable, 20-bytes long string. |
| SaidPublic | SAID public keys and public information. |
| SaidPrivate | SAID private key and private information. |
| SAID Owner | A real person who owns the SaidPrivate. |
| Bind | Make a real persona a SAID owner. |
| DsiSign | DSI data signed by a SAID. |
| SaidClaim | SAID owner self-made and signed statements. |
| ClaimTag | SaidClaim tag. |
| DSI Blockchain | A DSI-provided blockchain for publishing SaidPublic and SaidClaim. |

*FIG. 17*

Annex Terminology

| Term | Description |
| --- | --- |
| Policedure | Policy and procedure. |
| Annex | DSI data with descriptions, readers, policedures, data payloads, and DsiSign. |
| DataAnnex | Annex for data sharing. Only owner-designated readers can decrypt it. |
| MsgAnnex | Annex for messaging. Only the receiver can decrypt it. |
| Obscured SAID | Scrambled SAID. Only the designated readers can positively identify the SAID. |
| Obscured Signer | Obscured signer SAID. Only the designated readers can reveal the signer. |
| Zero Daemon | No one can decrypt data without data owners' explicit permission. |
| Zero Data Access | Zero Daemon. |
| DSI Storage | DSI-provided data storage for storing, sharing, and exchanging DSI data. |

*FIG. 18*

DSI Persona Terminology

| Term | Description |
|---|---|
| Persona | A running software program has a permanent SAID, binds with human beings, and pulls data from enclaves. |
| Enclave | A running software program has a permanent SAID, binds with human beings, and accepts incoming connections. An enclave acts as a persona if it pulls data from other enclaves. |
| DSI Persona | A persona or an enclave. A DSI persona can have multiple real person owners. A real persona can bind with multiple DSI personas. |
| Privilege | DSI persona's resource access rules. |
| Contact | DSI persona's information, e.g., SaidPublic, SaidClaims, DsiCerts, etc. |
| Schedule | DSI persona's work schedule |
| Folder | DSI persona's file cabinet |
| Owner | A real person who owns a DSI persona. |
| Possessor | A DSI persona who has owner's privileges of the possessed DSI persona. |
| Admin | A DSI persona who has admin's privileges of administrated DSI persona. |
| Visitor | A DSI persona who has visitor's privileges of visited DSI persona. |
| Delegator | A DSI persona who authorizes privileges to a delegatee. |
| Delegatee | A DSI persona who gains privileges from the delegator. |
| DsiCert | A Delegation certificated signed by the delegator. |
| Zero Factor Authentication | Anyone can authenticate a DSI persona without needing additional factors. |
| Zero Trust | No DSI persona is required to trust other DSI personas. |
| Actallet | A library functions as the DSI persona's core. All DSI personas build on top of Actallet. |
| Actallet Device | • Personal Device: for personal and mobile computers.<br>• System Device: for computer server machines.<br>• IoT Device: for IoT devices. |
| Keybox | Actallet's bootstrap file. Only the SAID owners on Actallet creation can open KeyBox. |
| Database | Actallet's on-device database. Only the SAID owners can open the database. |
| Sandbox | A database partition. Only the sandbox creator can open the sandbox. |
| Driver | Actallet's communication library. Each driver implements one side of a DSI protocol. |
| Orchestrator | DSI persona's main function. It calls Actallet API to become a DSI persona. |
| Console | DSI persona's control console. |
| GUI Console | On-device GUI console. Only a real persona can touch the GUI console. |
| Web Console | On-device web console. Only a real persona can touch the web console. |
| CLI Console | A console DApp. DSI personas with admin privileges can access the CLI console. |

*FIG. 19*

DSI Internet Terminology

| Term | Description |
|---|---|
| DSI Network | Interconnected personas via enclaves. |
| Enclave Protocol | DSie: persona-to-enclave synchronous communication protocol. |
| Authentication | SAID-to-SAID mutual authentication. |
| Registration | DSI-Persons-to-DSI-Person trust negotiation. |
| Trust Negotiation | Exchange and validate SaidClaims. |
| Message Protocol | DSIm: persona-to-persona asynchronous communication protocol. |
| Subscription | Receiver subscribes mailroom annexes from senders. |
| DSie Schema | DSie://EnclaveSaid/[DAppId/]EndpointPath[?Query[#Fragment]] |
| DSIm Schema | DSIm://ReceiverSaid/[DAppId/]EndpointPath[?Query[#Fragment]]/MailroomSaid |
| Persona Driver | A library that implements the persona side of DSie. |
| Enclave Driver | A library that implements the enclave side of DSie. |
| Enclave Channel | A communication channel between a persona and an enclave. |
| MsgDriver | A library that implements one side of DSIm. |
| MsgGroup | DSI message group. |
| Authentication MsgAnnex | A "Hello" MsgAnnex with fully specified receiver SAID. |
| Message MsgAnnex | A MsgAnnex with obscured receiver SAID. |
| SAM | Smart Annex is an enclave's annex management subsystem. |
| App Function | SAM invokable annex policedure. |
| Map Reduce | App function works on annexes distributed in multiple enclaves. |
| Mailroom | A DSI-provided enclave that implements the DSIm protocol. |
| DSI Backup | A DSI-provided enclave that backs up a persona. |
| DSI Root | A DSI-provided persona that issues and certifies DSI-trusted personas and enclaves. |
| DSI Ecosystem | A DSI-provided DSI persona for all DSI network users. |
| Marketplace | A DSI-provided services for selling, searching, and purchasing DSI applications. |
| SecMembrane | Persona-enclave pair converts a client-server application to a DSI application. |

*FIG. 20*

Decentralized Application Terminology

| Term | Description |
|---|---|
| DSI Application | A decentralized application involves multiple DSI personas. |
| SRA | Service Representative Architecture for developing a decentralized application. |
| DApp | SRA architected App. DApps are Orchestrator's toolkits. |
| DAppId | 20 bytes ID that can uniquely identify a decentralized application. |
| Built-in DApp | DApp statically compiled with an Orchestrator. |
| Plug-in DApp | DApp dynamically loaded by an Orchestrator. |
| Rep | Service representative, identified by MySaid.DAppId.RemoteSaid. |
| Endpoint | DApp service API, identified by MySaid.DAppId.Endpoint. |
| CollApp | An App runs on a DSI persona's device and calls the DSI persona's intents. |
| Intent | DSI persona authorized APIs for CollApps to access. |
| AddressBook | A DSI-provided DApp manages a DSI persona's contact information. |
| Calendar | A DSI-provided DApp manages a DSI persona's work schedule. |
| Directory | A DSI-provided DApp manages a DSI persona's data. |
| Messenger | A DSI-provided message DApp manages a DSI persona's communication. |
| ConsoleApp | A DSI-provided console DApp manages a DSI persona's CLI console. |

*FIG. 21*

SELF-AUTHORIZING IDENTIFICATION AND APPLICATIONS THEREFOR

CROSS-REFERENCE TO RELATED APPLICATION

This application is a 35 U.S.C. § 371 national stage of International Application No. PCT/US2021/046638, filed Aug. 19, 2021, entitled "SELF-AUTHORIZING IDENTIFICATION AND APPLICATIONS THEREFOR," which claims the benefit of priority to U.S. Provisional Application Ser. No. 63/068,784 filed Aug. 21, 2020 entitled "SELF-AUTHORIZED IDENTIFICATION AND APPLICATIONS THEREFOR," the entire contents of both of which being hereby incorporated by reference in their entirety herein.

BACKGROUND

Today, connections to the Internet and other computer networks are made anonymously from vastly different types of networking devices. While connections are made using an internet protocol (IP) address, it is difficult and sometimes impossible to associate an IP address with an individual or a particular computing device. Due to the anonymity, the current state of the Internet and similarly configurable networks inevitably suffers from a multitude of types of malicious attacks ranging from denial-of-service, man-in-the-middle, phishing, drive-by, and eavesdropping attacks, among others. Currently, Internet users have to create and remember numerous and complex passwords, perform multi-factor authentication, block spam phone calls and emails, remain cognizant of identity theft, and so forth as network security was not a major focus in its original design. Consequently, enterprises spend close to a quarter of their efforts annually to protect their properties and products on the Internet. Also, due to the Internet being generally anonymous (e.g., identification only being performed using IP addresses), it is difficult for data owners to control who may access their data.

BRIEF DESCRIPTION OF THE DRAWINGS

Many aspects of the present disclosure may be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 17-21 are tables illustrating example terminology used herein according to various embodiments of the present disclosure

DETAILED DESCRIPTION

The present disclosure relates to network authentication protocols and, more specifically, to self-authorizing identification protocols, secure network communication protocols, and applications thereof that prevent various types of network-based attacks. A decentralized system integration (DSI) network of computing devices is described herein according to various embodiments that includes network-based communication standards, conventions, and software architecture principles. The DSI network treats interconnected and interdependent software programs, organizations, machines, internet-of-things (IoT) devices, etc., as DSI personas, and may form communities that include real and/or virtual personas. Through the DSI network, real personas and/or virtual personas safely communicate with others, share data, and, most importantly, work together without use of a central authority.

The DSI reference model may rely on a self-authorizing identity (SAID) generated for an individual and/or a computing device. Any persona, real or virtual, can self-create and maintain a SAID for a respective computing device. In some embodiments, a SAID is a byte string that is a globally unique and immutable identifier. A virtual persona may refer to an organization, an application, a service, a thing, a device, and/or an entity that self-governs and interacts with others. In the DSI network, each persona, real or virtual, has a SAID that associates with a piece of public information and a piece of private information.

The persona or, in other words, the SAID owner, may include a computing device that creates and gives public information to any device desiring to interact with the SAID owner or its device. Any computing device can use the public information to authenticate the SAID owner, encrypt messages to the SAID owner, and/or decrypt messages from the SAID owner. The SAID owner creates and owns the private information. The SAID owner never reveals the private information to anyone, and never sends it out of its secure environment. No device but the SAID owner device can access the private information. The SAID owner uses the private information to authenticate itself, sign documents, encrypt messages to others, and decrypt messages from others. In some embodiments, the SAID is an identifier that points to the SAID owner device, but says nothing about the SAID owner. A SAID claim is a statement made by the SAID owner. It is up to the recipients to verify and trust a SAID claim. DSI provides a permissible blockchain for users to publish SAID, SAID public information, SAID claims, SAID attestations, and other SAID related information.

In the following discussion, a general description of the DSI network, the self-authorizing identifiers, and their components are provided, followed by a discussion of the operation of the same.

Figure 1:
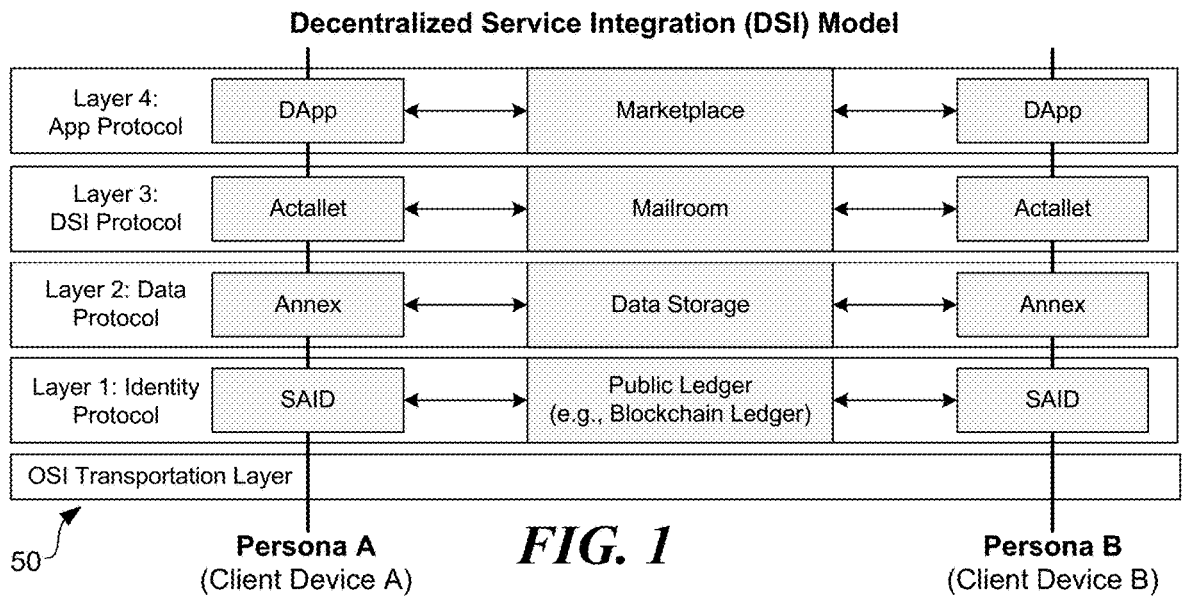
FIG. 1 is a schematic diagram for a decentralized system integration (DSI) model to be employed in a networked environment in accordance with various embodiments of the present disclosure.

Referring now to FIG. 1, a schematic diagram of DSI network model 50 is shown according to various embodiments. Decentralized system integration, or DSI, is an architecture reference model for implementing a "DSI Internet," referring to herein as a DSI networked environment. The DSI network model 50 includes various network communication standards, conventions, and software architecture principles that make independent, but interconnected, entities such as computing devices, machines, software programs executing on client devices, internet-of-things (IoT) devices, and interfaces to real personas, as DSI personas, and allow DSI personas to safely and scalably communicate with one another without use of centralized authorities.

According to various embodiments, a DSI stack may be constructed on top of an open systems interconnection (OSI) transport layer. As shown in FIG. 1, the DSI network stack may include four layers of abstractions or, in other words, four layers of protocols, as will be described, that permit a first persona ("Persona A") of a first computing device to communicate securely with a second persona ("Persona B") of a second computing device through an enclave service, for example, as will be described. Personas A and B may be real personas, virtual personas, or a combination thereof. The first layer of the DSI network model 50 includes a blockchain, the second layer includes a data protocol, the third layer includes a messaging protocol, and the fourth layer includes an application protocol, as will be described.

Figure 2:
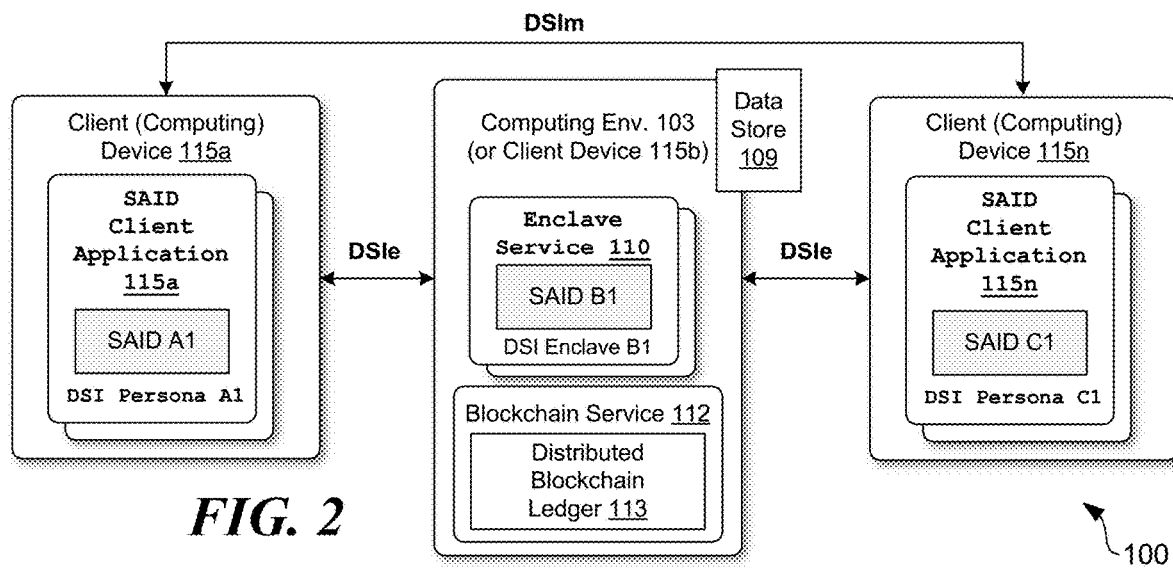
FIG. 2 is a schematic diagram of a networked environment including a computing environment executing a decentralized public ledger service, such as blockchain service, in communication with client devices over a network in accordance with various embodiments of the present disclosure.

Turning now to FIG. 2, a schematic diagram of a DSI networked environment 100 is shown according to various embodiments. The DSI networked environment 100 includes a computing environment 103 and a number of client devices 106a . . . 106n (collectively "client devices 106"), which are in data communication with each other via a network. Such data communication over the network may be referred to as DSI data, with may include DSI data objects confirming to predefined standards. It can be stored, transmitted, parsed, and understood by all DSI components of the DSI networked environment 100 as will be described. The network includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments, such as an enclave service 110. Also, various data is stored in a data store 109 that is accessible to the computing environment 103. The data store 109 may be representative of a plurality of data stores 109 as can be appreciated. The data stored in the data store 109, for example, is associated with the operation of the various applications and/or functional entities described below.

The components executed on the computing environment 103, for example, include a blockchain service 112 implementing a blockchain protocol, and other applications, services, processes, systems, engines, or functionality not discussed in detail herein. The blockchain service 112 is a remote service that may store data in a ledger, such as a distributed blockchain ledger 113, as may be appreciated. For instance, the blockchain service 112 may store public data generated by a client device 106 in the distributed blockchain ledger 113 that may be used to encrypt messages to or decrypt messages from the client device 106.

In various embodiments, the computing environment 103 may be an enclave or, in other words, a service implementing one of more data exchange protocols to exchange data between various client devices 106 in the networked environment 100. For instance, the computing environment 103 may execute an enclave service that had predefined code or instructions that direct the computing environment 103 to implement a DSI-based data exchange protocol, referred to herein as DSIe, and a DSI-based messaging protocol, referred to herein as DSIm.

In some embodiments, an enclave services includes a software application that has a SAID 125, like the client devices 106, and may be bound to one or more human beings. The enclave service may accept client connections or, in other words, connections with the client devices 106. To this end, in various embodiments, client devices 106 may only connect to enclaves or enclave services. Unlike persona client devices 106, each enclave understands all layers of the DSI architecture, shown in FIG. 1, but may serve only one layer, for example, and therefore can be in an independent device. A computing device can have one or multiple enclaves, as may be appreciated.

In some embodiments, the computing environment 103 may further include a DSI root service that is a DSI persona that acts an authority root on behalf of the DSI networked environment 100. For instance, the DSI root service may issue certificates SaidCerts for DSI-provided services, such as the blockchain service 112 and other services described herein.

Further, in some embodiments, the computing environment 103 may include a DSI registration service that is a DSI persona that serves as a DSI service directory. It allows DSI personas to search for services registered on the DSI networked environment 100. The computing environment 103 may further include a DSI storage service that refers to storage enclaves. All registered DSI personas can use DSI storage service to share data, as will be described. The computing environment 103 may also include a DSI backup service that refers to storage enclaves for DSI persona backups and migrations between client devices 106. As such, all registered DSI personas may use the DSI backup service to backup and restore DSI personas. The computing environment 103 may further include a DSI mailroom service, referred to herein as a DSI mailroom enclave service or a mailroom enclave service for short, that is a reference implementation of a DSI messaging protocol, as will be described. All registered DSI personas may use the mailroom enclave service to send and receive message annexes. Message annexes include owner-signed DSI data transmitted over the networked environment 100. In some embodiments, message annexes include data descriptions, readers, policedures, and payloads, as will be described.

The client devices 106 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, IoT devices, or other devices with like capability. The client device 106 may or may not include a display device.

The client device 106 may be configured to execute various applications such as a SAID client application 115 and/or other applications. The SAID client application 115 may be executed in a client device 106, for example, to generate a SAID for a corresponding client device 106 and/or to access network content served up by the computing environment 103, other client devices 106, and/or other servers, thereby rendering a user interface on the display for applicable devices. To this end, the SAID client application 115 may comprise, for example, a browser, a dedicated application, etc., and the user interface may comprise a network page, an application screen, etc. The client device 106 may be configured to execute applications beyond the SAID client application 115 such as, for example, email applications, social networking applications, word processors, spreadsheets, and/or other applications.

Next, a general description of the operation of the various components of the DSI networked environment 100 is provided. To begin, to interact with the DSI network, the client device 106 or other computing device may generate a self-authorizing identifier (SAID) 125a . . . 125n (collectively "SAID 125") that is used to authenticate the client device 106, as will be described. To this end, in some embodiments, a user of a client device 106 may install an instance of a SAID client application 115 on the client device 106 that generates a SAID 125 in accordance with the DSI network protocol. In some embodiments, however, an issuing service, such as a trusted third-party service, may issue the SAID 125 to a client device 106.

Based on the foregoing, any client device 106 executing an instance of the SAID client application 115 can issue a globally unique and immutable SAID 125 without needing to coordinate with another device. Only the issuer, the owner of the SAID 125, can prove it owns a SAID 125. Anyone can prove the ownership of a SAID 125 without needing to interact with another device or service. In some embodiments, the SAID 125 may be key schema-agnostic. In other words, the owner of the SAID 125 may choose public-private key schemas, sizes thereof, and so forth. Only the owner of the SAID 125 can upgrade key versions and terminate the SAID 125. In some embodiments, the SAID 125 or a data object associated therewith includes its computing capacity.

In some embodiments, the SAID 125 may include a byte string (e.g., a 20-bytes long byte string) that is a digest of a first-generated public key relative to time or, in other words, the oldest generated public key that is still active. The SAID 125 never changes although users have the ability to upgrade keys or key-generating protocols. However, in some embodiments, the SAID 125 may be prefixed or suffixed with a predefined byte string (e.g., two bytes) of a version to indicate a type of key used. In various embodiments, a SAID 125 may be associated with two data objects, namely, a public data object SaidPublic (e.g., information to be made public) and a private data object SaidPrivate (e.g., information to be kept private).

The public data object SaidPublic may include data to be published by the blockchain service 112 on a distributed blockchain ledger 113 or otherwise shared with other client devices 106 in the DSI network, whereas the private data object SaidPrivate may include data to be stored and retained privately on a client device 106. For instance, an owner of the SAID 125 owns the private data object SaidPrivate, protects it using a key management service software or a hardware security module on a client device 106, uses it to prove it owns the SAID 125, and never shares the private data object SaidPrivate or the data contained therein with another device. To this end, losing the private data object SaidPrivate is, in effect, a loss of an identity of an owner of a client device 106. However, the owner of the SAID 125 can always terminate the SAID 125 to invalidate the SAID 125.

In some embodiments, the owner of the SAID 125, via the SAID client application 115, must indicate if the SAID 125 represents a real individual (e.g., a real persona), an IoT device, or an automaton (e.g., a bot). As such, the public data object SaidPublic may include an indication of whether the owner is a real persona or a virtual persona. If it is for an automaton or, in other words, a virtual persona, the public data object SaidPublic generated for the client device 106 may include computing power and communication capacity of the device (e.g., an IoT device, a client device 106, a server, and so forth).

By default, a SAID 125 may be categorized as a real persona. Ultimately, the owner of a SAID 125 is a real persona. Similarly, by default, the owner of the SAID 125 publishes the public data object SaidPublic on the blockchain service 112, meaning the public data object SaidPublic and the SAID 125 contained therein are published in the distributed blockchain ledger 113 in accordance with a blockchain protocol. To this end, any device can query the public data object SaidPublic via the blockchain service 112 and use the public data object SaidPublic to validate a client device 106 having a predetermined SAID 125, to encrypt messages to be sent to a client device 106 of the SAID 125, or to decrypt messages received from the client device 106 of the SAID 125.

In some embodiments, the blockchain service 112 is an enclave that allows DSI personas or, in other words, client devices 106 of the DSI networked environment 100, to register their public data object SaidPublic, self-claimed statement data object SaidClaim, and certificates SaidCert. A self-claimed statement data object SaidClaim is a self-claimed statement, such as "My name is Angelo, and I'm the owner of this client device." As such, a self-claimed statement data object SaidClaim is a statement made and signed by an owner of a corresponding SAID 125. A self-claimed statement data object SaidClaim and a certification SaidCert may be signed by another DSI persona (e.g., a different client device 106) that normally is a reputable and commonly trusted DSI persona, such as an authentication service.

Since each DSI persona, or client device 106, has a unique SAID 125, the DSI networked environment 100 may assure that two communicating DSI personas can recognize each other by their SAID 125 without mistake and ambiguity. However, knowing an identity of a DSI persona does not mean trusting the owner of the SAID 125. Similar to the real-word, Jane can privately talk to Joe does not mean Jane trusts Joe, even if Jane knows she is talking to the right Joe. Even if Joe has what Jane wants, Jane will not do business with Joe unless Jane trusts Joe.

As such, the DSI networked environment 100 may implement trust policies. In some embodiments, a trust policy indicates that trust is a private matter between two personas. Trust is self-defined meaning that only the persona's self can determine what, when, and how to trust another persona. Trust is asymmetric. Persona A trusting Persona B does not mean that Persona B trusts Persona A. Trust is accumulative. Persona A may not trust Persona B much today, but can trust Persona B more tomorrow. Trust is impermanent. Persona A trusting Persona B today does not mean that Persona A will trust Persona B tomorrow. Trust is non-transitive. Persona A trusting Persona B, and Persona B trusting Persona C does not mean that Persona A trusts Persona C.

The DSI networked environment 100 may thus provide registration processes for two DSI personas to negotiate and establish trust relationships. The DSI networked environment 100 thus provides mechanisms for DSI personas to validate, share, and transfer trust attributes, and a user of a client device 106 may adjust a trust score for other personas in the DSI networked environment 100 indicative of a trust of another persona.

In some embodiments, when registering with the blockchain service 112, the client devices 106 may specify a name and a size declaration that indicates how fast the client device 106 can make requests or service requests. As such, the registration process enables service providers to negotiate serviceability with client devices 106. For instance, a computing cluster or a powerful computing device may be able to handle millions of requests from real and/or virtual personas. A real persona, however, may be able to only make tens of requests per second. For automatons and virtual personas, service providers may have enough information to statically and dynamically scale services for the client devices 106.

Figure 3:
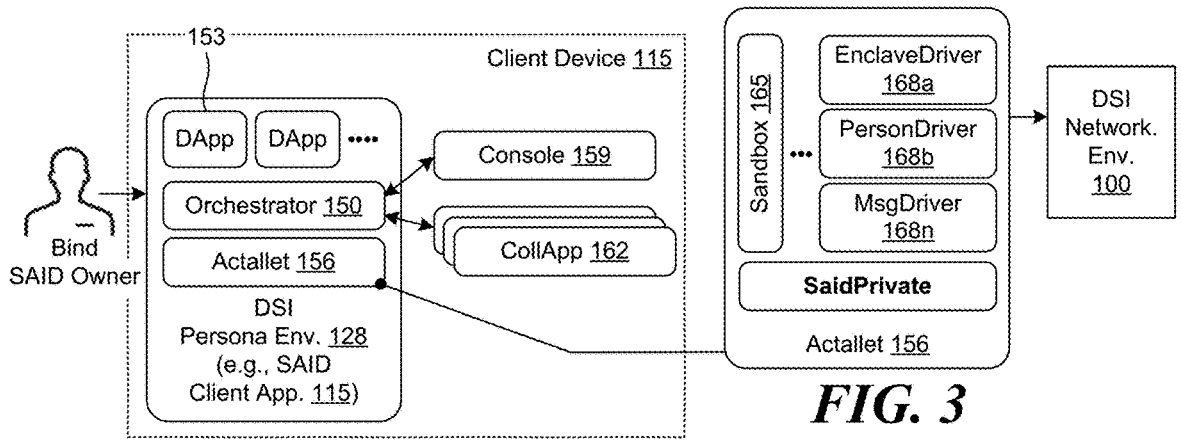
FIG. 3 is a schematic diagram of a DSI persona environment executable on a client device according to various embodiments of the present disclosure.

Referring next to FIG. 3, a schematic diagram of a DSI persona environment 128 executable on a client device 106 is shown according to various embodiments. The DSI persona environment 128 may be the SAID client application 115, or the SAID client application 115 may execute in the DSI persona environment 128. As such, in some embodiments, the DSI persona environment 128 is an isolated environment, such as a virtual machine or a container, that is logically isolated from other containers, applications, drivers, and/or services of a client device 106. The DSI persona environment 128 may be bound to an owner of a SAID 125. For instance, only an owner of the SAID 125 may have authentication information to access the DSI persona environment 128 and its corresponding information. As such, a real person (e.g., a user of the client device 115) becomes an owner of a SAID 125.

The DSI persona environment 128 may represent a self-governed entity, such as an organization, program, resource, autonomous device, internet-of-things (IoT) device, or an interface to a real person. Each DSI persona environment 128 and/or each SAID client application 115 in the DSI networked environment 100 may have a SAID 125 as its identity or, in other words, a globally unique and immutable identifier. As may be appreciated, an owner of a SAID 125 may own and operate the SAID client application 115. Any device in the DSI networked environment 100 may independently verify a SAID client application 115 regardless of where, when, and how the SAID client application 115 appears using its SAID 125 and/or public data object SaidPublic.

The SAID client application 115 may be bound with the owner of the SAID 125, which traditionally is the owner or end user of a client device 106. However, in some embodiments, the owner of the SAID 125 may be multiple real personas. The DSI persona environment 128 may exist in only one location, e.g., executes on a single client device 106. The owner of the self-authorizing identifier 125 may move or migrate the SAID client application 115 from one client device 106 to another, but cannot simultaneously run two instances of the same SAID client application 115 or DSI persona environment 128.

In some embodiments, the DSI persona environment 128 includes an orchestrator 150, one or more distributed client applications ("DApps") 153, and an actallet 156. The orchestrator 150, also referred to as an orchestrator service, may include logic of the SAID client application 115 and the logic may control a console 159 that interfaces with a user or owner of the client device 106, for instance, through a graphical user interface (GUI) and one or more user interface screens. A SAID client application 115 may be a self-governed automaton, but it is an end user (e.g., an operator of the client device 106) who makes the ultimate decisions. As such, end users of the client device 106 use the console 159 to control the SAID client application 115 and communicate with other client devices 106.

The orchestrator 150 may manage or oversee the console 159 and the DApps 153, as well as permitted collaborating applications ("CollApps") 162 to access its API (e.g., intents). The orchestrator 150 may execute on various types of user interfacing-types of client device 106, such as mobile devices (e.g., smartphones, tablets, laptops, and so forth) as well as other computing devices. The orchestrator 150 allows both built-in and plug-in distributed client applications 153, and has a console 159 on the device that presents a graphical user interface. In some embodiments, only the owner of the SAID client application 115 may access the console 159 and its GUI. Non-user interface devices, such as system devices that include desktop and server computers, may allow only built-in distributed client applications 153 and may or may not have a GUI console. IoT devices may allow only built-in distributed client applications 153, and may not have a GUI console.

For example, in some embodiments, CollApps 162 may include a console 159 or similar application that issues and processes console commands issued to or from another DSI persona; a messenger or email application that permits text, voice, video, or other media-based communication with another DSI persona; a notification application that sends notification-type messages to other DSI personas; a backup application that backs up and restores a DSI persona to and from the DSI backup service; as well as other types of applications as may be appreciated.

Distributed client applications 153 and collaborating applications 162 may include client applications executing in or in association with the SAID client application 115. For instance, DSI persona environments 128 on different client devices 106 with the same DApp 153 (e.g., an instant messaging application) can communicate with each other. Collaborating applications 162 include client applications that execute on the same client device 106 as the DSI persona environment 128. With adequate permissions, the orchestrator 150 and the collaborating applications 162 may communicate with each other. As such, the orchestrator 150 is configured to manage or oversee the console 159 and the DApps 153 and the CollApps 162, wherein the orchestrator 150 determines whether to permit individual ones of the DApps 153 and the CollApps 162 to access a respective application programming interface to retrieve at least one of the SAID 125 and the public data object SaidPublic from local memory of the client device 115.

The actallet 156 includes a part of the DSI persona environment 128 or the SAID client application 115 that stores and oversees the private data object SaidPrivate, as well as handles communication with other client devices 106 in the DSI networked environment 100. In some embodiments, the actallet 156 is a separate application from the SAID client application 115.

A DSI persona (e.g., a client device 106) may have a set of common resources managed by the orchestrator 150. Additionally, the orchestrator 150 provides APIs for DApps 153, CollApps 162, and other DSI personas to access various common resources. In some examples, the common resources include one or more of a profile, a calendar, a contact or address book, a folder, and so forth. The profile may describe a DSI persona, including an owner, role, associated endpoints, etc. The calendar may include the DSI persona's past, current, future, work schedules, and events. The contact or address book may include a database of all the DSI personas with which a client device 106, or user thereof, has a relationship. A folder may store documents of a DSI persona, the DSI persona environment 128, or an enclave.

A decentralized application, or DApp 153, includes is a software program that runs inside an environment and may communicate with other DApps 153 with having a same identifier DAppID. In some embodiments, the orchestrator 150 oversees and controls the decentralized applications DApps 153 on a client device 106 (or remote DApps 153). To this end, decentralized applications DApps 153 can only call an API of the orchestrator 150 to access resources of a DSI persona. In some embodiments, there may be multiple types of DApps 153, such as built-in DApps 153 and plug-in DApps 153. Built-in DApps 153 may include DApps 153 statically compiled with the orchestrator 150 at the SAID client application 115 development time. Plug-in DApps 153 may include applications dynamically loaded into the orchestrator 150 at runtime of the SAID client application 115.

As noted above, a DApp 153 may have a globally unique identifier DAppId. A DApp 153 can communicate with other DApps 153 hosted by other DSI personas or other DSI persona environments 128, and those with the same globally unique identifier DAppId. DApps 153 with different DAppIds cannot communicate with each other. CollApps 162, on the other hand, are software program that runs on a same client device 106 as the SAID client application 115, but outside the same environment. With the DSI persona's permission, the orchestrator 150 publishes intents for CollApps 162 to access services of a SAID client application 115.

An end user of a client device 106 may use the console 159 and its GUI to manipulate a DSI persona. In some embodiments, the console 159 may be one or more of an on-device GUI console, a web-based console, and a console of a DApp 153. Mobile devices and system devices that support on-device displays have an on-device GUI console, for example. End users may use a password or other authentication data to access the console 159. Alternatively, end users can use their personal mobile devices to access a GUI of the console 159 remotely. System devices may have a web server and end users may use their client devices 106 to access a web-based console as a web client, thereby permitting backward compatibility. In some embodiments, the client devices 106 include a command-line DApp console. DSI personas may use the DApp console to send commands to another DSI persona, for example.

The actallet 156 includes logic that protects resources from being directly accessed by the orchestrator 150, DApps 153, and/or CollApps 162. For instance, in some embodiments, only the orchestrator 150 may access an API of the actallet 156 to protect various resources, such as the private data object SaidPrivate, a sandbox 165, and/or drivers 168a . . . 168n.

As may be appreciated, security is the foundation of the DSI network. Compromising the private data object SaidPrivate may destroy security of a DSI persona. The actallet 156 may protect the private data object SaidPrivate in a special file, such as a keybox file, that may be encrypted by the SAID client application 115, for instance, using an owner-provided password and/or a device signature. As such, only the owner designated persona of a client device 106 can open or access the keybox file. The actallet 156 will never let a service directly access the private data object SaidPrivate and will never send it outside the actallet 156.

The sandbox 165 may include a private data store or database of a client device 106 and/or the SAID client application 115. As such, the DSI persona environment 128 may include a local data store or database. The actallet 156, for example, may partition the database so that DApps 153 other than the owner of the sandbox 165 cannot read from and write to the database. The actallet 156 encrypts data automatically when writing them onto the local database.

Referring now to the drivers 168, DSI personas must follow DSI protocols to communicate over the DSI networked environment 100 or the "DSI Internet." Drivers 168 may implement DSI communication protocols, and only the actallet 156 has access to the private data objection SaidPrivate to call APIs of the drivers 168. The drivers 168 may include an enclave driver 168a that communicates with enclaves in the DSI networked environment 100, a persona driver 168b that communicates with other client devices 106, and a message driver 168n that communications with mailroom enclave services, as will be described.

An owner of a client device 106 may permit other DSI personas to manipulate the DSI persona environment 128 and/or the SAID client application 115. The DSI persona environment 128 may recognize a possessor, an administrator, and a user, for example. A possessor may include the DSI persona that acts as the owner of the SAID 125. As such, it has the full right to control the DSI persona environment 128, but cannot become the owner nor directly access the private data object SaidPrivate. Only the owner of the SAID 125 and possessors have the right to add and drop a possessor. An administrator is a possessor with limited rights to manipulate the DSI persona environment 128. Only the owner of the SAID 125 and possessors have the right to add and drop an administrator. A user is a DSI persona other than a possessor or an administrator. Possessors and administrators may be visitors by definition. Only the owner of the SAID 125, possessors, and administrators can add and drop visitors.

By default, only the owner of the SAID 125 can make the DSI persona's ultimate decisions. However, the owner of the SAID 125 can designate possessors to assume the owner's responsibility. For example, the DSI persona environment 128 may allow Persona A to do business as Persona B, if Persona B issues a delegation certificate to Persona A. If Persona B visits Persona C and Persona C allows only Persona A to access its resources, Persona C will deny access to Persona B. However, if Persona B, the delegatee, has a delegation certificate from Persona A, the delegator, and Persona C honors the delegation certificate, Persona C will allow Persona B to do business as Persona A. The delegator, Persona A, may thus sign a delegation certificate and give a certificate to Persona B and/or Persona C, and Persona C honors the delegation certificate.

Figure 4:
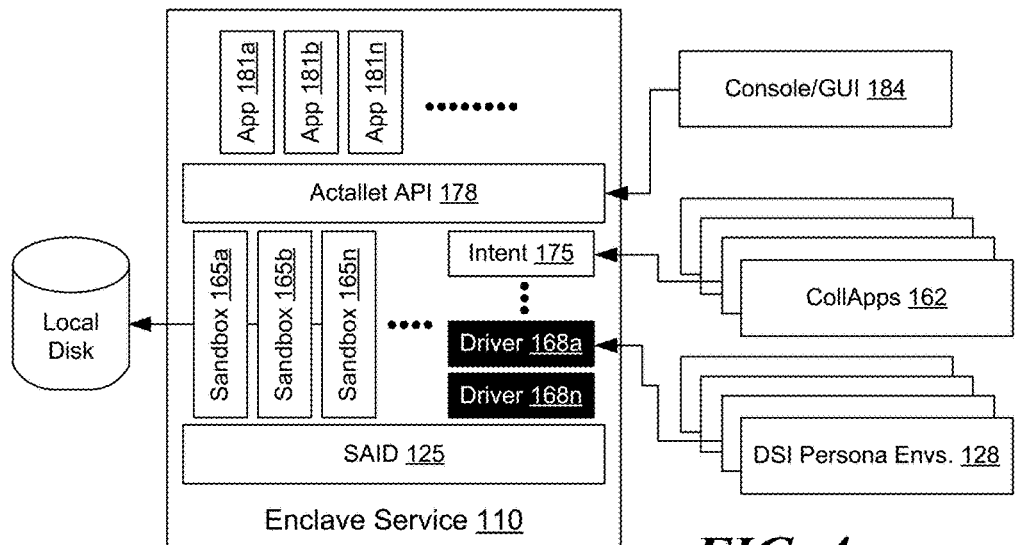
FIG. 4 is a schematic diagram of a DSI persona environment executable on a client device according to various embodiments of the present disclosure.

Turning now to FIG. 4, a schematic diagram of an enclave service 110 executing in an enclave 187 (e.g., the computing environment 103) having a unique SAID 125 is shown according to various embodiments. An enclave service 110 may include a software application that represents a DSI persona similar to a DSI persona environment 128. The enclave service 110 may oversee and manage a SAID 125 of a the computing environment 103 or client device 106, uses the SAID 125 to identify the owner of the enclave service 110 (e.g., the owner of the computing environment 103 or client device 106), runs the owner's applications, interfaces with the owner or administrators of the enclave service 110, and represents the owner of the enclave 110 to communicate with the outside world or, in other words, over the DSI networked environment 100.

Like a DSI persona environment 128, the enclave service 110 may include a SAID 125 of the owner or, in other words, the SAID 125 of the client device 106, the public data object SaidPublic, the private data object SaidPrivate, one or more sandboxes 165a ... 165n, drivers 168a ... 168n, intents 175, an actallet API 178, enclave applications 181a ... 181n, and so forth. The sandboxes 165 may include isolated, independent, and local persistent data storage stored on a local disk or local memory of the client device 106, for example. The drivers 168 are connectors to external data storage. The intents 175 include interfaces with local applications on the client device 106. The actallet API 178 includes an interface for communicating or invoking enclave applications 181 and an owner of the enclave 187.

In some embodiments, there may be two types of persona environments 128, namely, persona environments for deployment of real personas and persona environments for deployment of virtual personas. In other words, a persona environment may represent a real persona, runs on a client device 106, and allows only one SAID 125 per device. A persona environment may represents a virtual persona, runs on a server (e.g., the computing environment 103) or an IoT, and allows multiple SAIDs 125 per client device 106 (e.g., multiple SAID client applications 115 and/or enclave services 110).

The owner of the SAID 125 owns the enclave service 187 or environment (e.g., isolated environment) in which the enclave service 187 executed therein, and uses a console/GUI 184 to interact with and administrate the enclave service 110. Enclave 187 owners can grant other SAIDs 125 as if they are the owners, caller controllers, or the managers, called administrators, to interact with the console 184 of the enclave service 110. Otherwise, no one can interact with the console 184 or administrate the enclave service 110. Only the owner can determine what the enclave service 110 can do.

Figure 5:
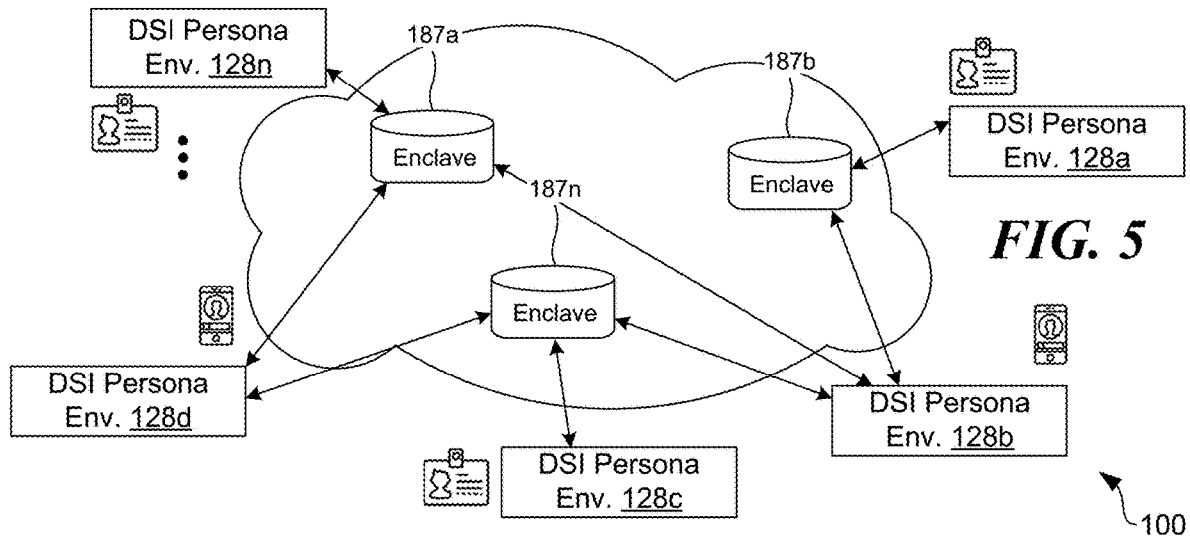
FIGS. 5 and 6 are other schematic diagrams of the DSI networked environment according to various embodiments of the present disclosure.

Turning now to FIG. 5, another schematic diagram of the DSI networked environment 100 is shown according to various embodiments. The DSI networked environment 100 may further include DSI persona environments 128 (having an instance of a SAID client application 115) executing on client devices 106 communicating with one another through one or more enclaves 187a ... 187n (collectively "enclaves 187") executing enclave services. An enclave 187 may include a client device 106, server, collection of services, or other similar computing device that is identifiable by a SAID 125, that includes a permittable storage device, and which passively waits for registered client devices 106 to exchange data.

In some embodiments, the DSI networked environment 100 may include at least two different types of enclaves 187, namely, data enclaves and message enclaves. A data enclave may include an enclave 187 that stores data annexes, data assets (DasSets), or other formatted data. In various embodiments, data enclaves do not communicate with each other, and the client devices 106 must specify which data enclaves 187 with which they want to read and write data.

A message enclave, on the other hand, stores message annexes and is associated with a message delivery system. Each client device 106 may only register with one message enclave, in some embodiments, and that message enclave forwards message annexes from a sender client device 106 to receiver client devices 106 registered with the message enclave. In other words, the client devices 106 may send and receive their message annexes through a single message enclave.

The DSI networked environment 100 may include multiple message delivery systems, as may be appreciated. In this case, the client devices 106 must decide which message delivery system to deliver their message annexes. In some embodiments, the client devices 106 use a driver 168, namely, an enclave driver 168a (shown in FIG. 4), to communicate with an enclave 187. The driver 168 may support one or more transport protocols, such as Web Socket, HTTP, SMTP, wireless fidelity (Wi-Fi), Bluetooth®, and so forth.

Figure 6:
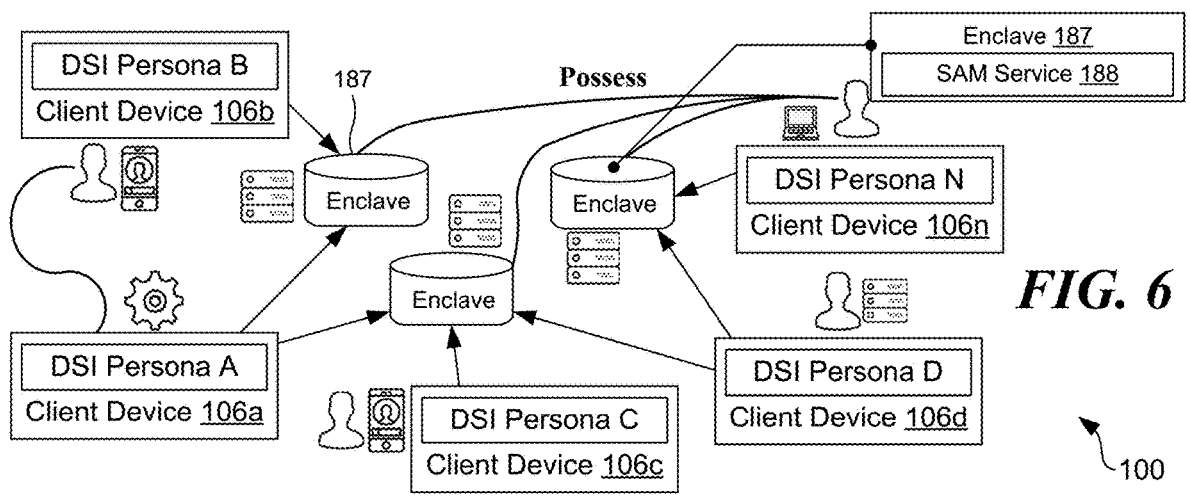

Ultimately, as shown in FIGS. 5 and 6, the DSI networked environment 100 is a network of DSI personas or, more specifically, client devices 106 executing the SAID client application 115, an enclave service, and/or a DSI persona environment 128. The DSI networked environment 100 guarantees a secure environment for DSI personas to network with each other without facing today's internet attacks or relying on centralized agencies to manage security issues. DSI personas need only to trust themselves and respect their own self-autonomy. In some embodiments, the DSI networked environment 100 may abide by the following networking security principles.

By default, the DSI networked environment 100 requires DSI personas to publish their public data object SaidPublic in the distributed blockchain ledger 113 via the blockchain service 112, where the public data object SaidPublic may include their SAID 125.

In various embodiments, the client devices 106 of the DSI networked environment 100 do not accept any incoming connections. For instance, all of their incoming ports may be closed. The client devices 106 only pull data from enclaves 187 that are also DSI personas configured to accept incoming requests from DSI personas and their client devices 106. The client devices 106 and enclaves 187 make their own security decisions, i.e., trust no one but themselves. They take responsibility for whom they want to communicate with.

DSI personas and their client devices 106 must follow DSI protocols to register with one other. DSI personas and their client devices 106 own their data. Only owner-designated DSI personas can decrypt the data. An enclave 187 is a DSI persona and client device 106 (or a server or an IoT device, for example) that provides services for other DSI personas.

Only enclaves 187 may accept incoming connections from other DSI personas, and non-enclave DSI personas do not accept incoming connections from any DSI personas. DSI personas and their client devices 106 use enclaves 187 to push and pull annexes. Non-enclave DSI personas only pull data from enclaves 187. A DSI persona may make its own decisions on which enclaves 187 with which it wants to share annexes. An enclave 187 determines by itself on which DSI personas it offers its services. In some embodiments, before a DSI persona starts exchanging annexes with an enclave 187, it must first register with the enclave 187.

In some embodiments, one or more enclaves 187 of the DSI networked environment 100 may include a smart annex management (SAM) service 188, which may include an annex management application embedded in and controlled by an enclave 187. The SAM service 188 may regulate data of the enclave 187 according to predefined constraint and/or logic, which may include contracts between the data owner and the data holder. For instance, a client device 106 and the enclave 187 may form a contract on what the enclave 187 should do when others access data. The contract may include the policedures (policies and procedures) embedded in the annex 190, for example. The SAM service 188 may include an application, engine, or other logic that oversees and executes the policedures. Annex owners can ask the SAM service 188 to control their data access by designating the enclave 187 as read-only. Since the SAM service 188 is a part of the enclave 187 (e.g., carries the hosting enclave SAID), the SAM service 188 can access an annex. Further, when other client devices 106 want to access the data, they can request that the SAM service 188 to retrieve the data. The SAM service 188 allows the data owners to decouple with the data users while still having full control of their data. If the data owner re-encrypts the data with another key, no one, including the SAM service 188, can access the data anymore unless the data owners renew the annex.

In some embodiments, third-party application developers may invoke one or more AppFunctions routine that are managed and called by the SAM service 188. For instance, an owner of an annex may delegate the SAM service 188 in the enclave 187 to call an AppFunction routine to manipulate payloads of an annex 190 base on policedures (policies and procedures) defined in the annex. The SAM service 188, on behalf of the owner of the annex, may execute the AppFunction routines and use an identity of the enclave 187 to read and write annexes. The third-party application developers, however, have no control over when, how, and who executes the AppFunction routines. Accordingly, the DSI networked environment 100 can use AppFunction routines, annexes, and the SAM service 188 to implement a MapReduce system, for example. Annexes can be distributed by the enclave 187 to multiple compute partitions where AppFunction routines can be executed in parallel by different SAM services 188, or threads or processes thereof.

Figure 7:
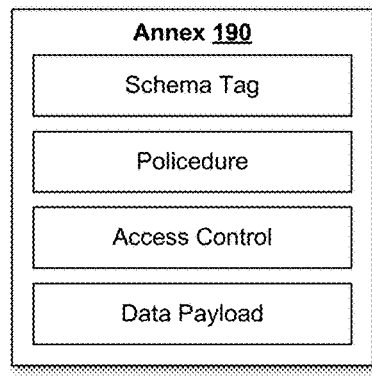
FIG. 7 is a schematic diagram of an example of an annex according to various embodiments of the present disclosure.

Referring now to FIG. 7, a schematic diagram of an example of an annex 190 is shown according to various embodiments. Annexes 190 are self-protected data objects generated by a client device 106 and transmitted over the DSI networked environment 100. In some embodiments, annexes 190 are DSI-defined, Google protocol buffer serialized data objects. All client devices 106 (e.g., real persona devices and/or virtual persona devices, such as enclaves 187) are configured to parse annexes 190.

In various embodiments, an annex 190 may include a schema tag payload, an access control payload, a data payload, a policedure payload, a signature payload, or other desired payloads. In some embodiments, the access control payload includes a list of SAIDs 125 that can decrypt the data payload of the annex 190. The schema tag payload may include an identifier that identifies a schema of the DSI data such that the data can be decoded by a receiving client device 106. The data payload may include user-provided data and/or data descriptions. Only the owner of the annex 190 as designated in the list of SAIDs 125 can decrypt the data. The policedure payload includes user data policies, manipulation scripts (e.g., AppFunctions), or other logic that may be executed by a receiving client device 106. Only the owner of the annex 190 (e.g., its originator) can designate the SAIDs 125 that are able to call policedures in the policedures payload to manipulate the data from the data payload. The signature may include a digital signature of an originator of the annex 190 or, in other words, the "owner" of an annex 190.

In some embodiments, the DSI networked environment 100 requires all data on-premise, on-transportation, or on-cloud in a data annex format regardless of whether the data is in a private or public environment. All of the devices in the DSI networked environment 100 may recognize and parse annexes 190 and, as such, all devices may read, intercept, or store annexes 190. However, only devices having SAIDs 125 designated by an owner of an annex 190 are able to decrypt the annex 190. Data annexes are for storing and sharing data, whereas message annexes are for communicating between two DSI persona environments 128 (executing on client devices 106) and/or enclaves 187.

In some embodiments, the access control payload of the annex 190 is a list of SAIDs 125 that can retrieve data encryption keys to decrypt the data payload portion of the annex 190, which may be the encrypted portion as may be appreciated. In some embodiments, the owner of an annex 190 through the SAID client application 115 may obscure a SAID 125 (referred to as an obscured SAID 125) of a reader or recipient by one-way hashing the byte string of the SAID 125. Accordingly, only the reader may positively confirm the SAID 125. Others may false-positively identify an obscured SAID 125, but cannot prove it is the given SAID 125 because they are not the owner of the SAID 125. Further, an annex 190 may include an obscured signer field, which may contain an obscured SAID 125 of the signer of the annex 190, which may be obscured using a one-way hash, for example. As such, only designated readers can reveal the signer and/or sender.

As noted above, in some embodiments, the annex 190 may further include a digital signature payment. To this end, in some embodiments, the digital signature includes a SAID 125 of the owner of the annex 190. To obscure the SAID 125 of the owner of the annex 190, the annex owner can use a payload encryption key to encrypt its SAID 125. Therefore, only a designated reader or recipient may be able to obtain the SAID 125 of the owner of the annex 190 to verify the digital signature.

Figure 8:
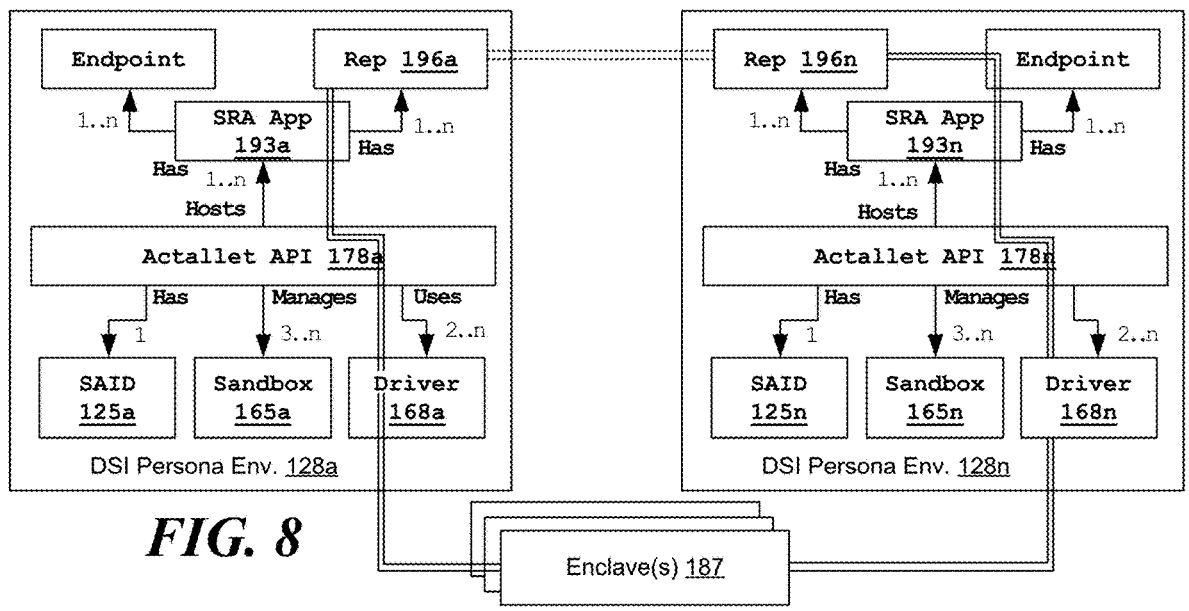
FIG. 8 is a schematic diagram illustrating service representative architecture (SRA) according to various embodiments of the present disclosure.

Turning now to FIG. 8, a schematic diagram illustrating service representative architecture (SRA). SRA is an architecture framework for DSI personas or, more specifically, client devices 106 to interact with each other. SRA assumes a client device 106, an owner of a SAID 125, trusts a service provider and wants to obtain services from a service provider, which is another owner of a SAID 125. Service provider applications 193a . . . 193n (collectively "service provider applications 193") assign a dedicated representative 196 to the client device 106. Since the representative 196 works only for the client device 106, the client device 106 can trust the representative 196. The dedicated representative 196 may be unique, permanent, and dedicated to the client device 106, and may have a unique representative identifier (e.g., "mySaid.DAppID.remoteSaid") in some embodiments. If the representative 196 asks for, say a birth certificate, the client device 106 can safely assume that the service provider application 193 requires the document. Only the service provider application 193 can access the birth certificate or other data. A client device 106 would not second guess the representative 196, and merely has to determine if it trusts the service provider application 193.

In some embodiments, representatives 196 in the DSI persona environment 128 may only access their sandboxes and cannot communicate with each other. Each representatives 196 work only for one caller and may keep secures for the caller in such a way that even the actallet API 178 cannot decrypt the security. A DApp 153 may define endpoints and accept messages sent to the endpoints. A DApp 153 has its sandbox and can only call the enclave service 110 to communicate with other DSI persona environments 128. The DSI persona environment 128 owns and controls the DApps 153 deployed in the DSI persona environments 128. A DApp API allows a DSI persona environment 128 to contact other DSI persona environments 128 via asynchronous messages, for example.

Accordingly, a service representative architecture may be implemented by receiving a confirmation by an owner of a SAID 125 to trust and obtain at least one service of a first instance of a service provider application 193 executing locally on the client device 115 that communicates with a second instance of the service provider application executing remotely on another client devices 115; generating and assigning a dedicated representative 196 for the service provider application 193, the dedicated representative 196 being a virtual service executing locally on the client device 115 capable of communicating with the second instance of the service provider application 193 executing remotely on the other client device 115; and establishing a trust relationship between the dedicated representative 196 and the client device 115 such that, when future requests from the dedicated representative 196 are received, the client device 115 automatically responds to the request and provides the requested information.

Figure 9:
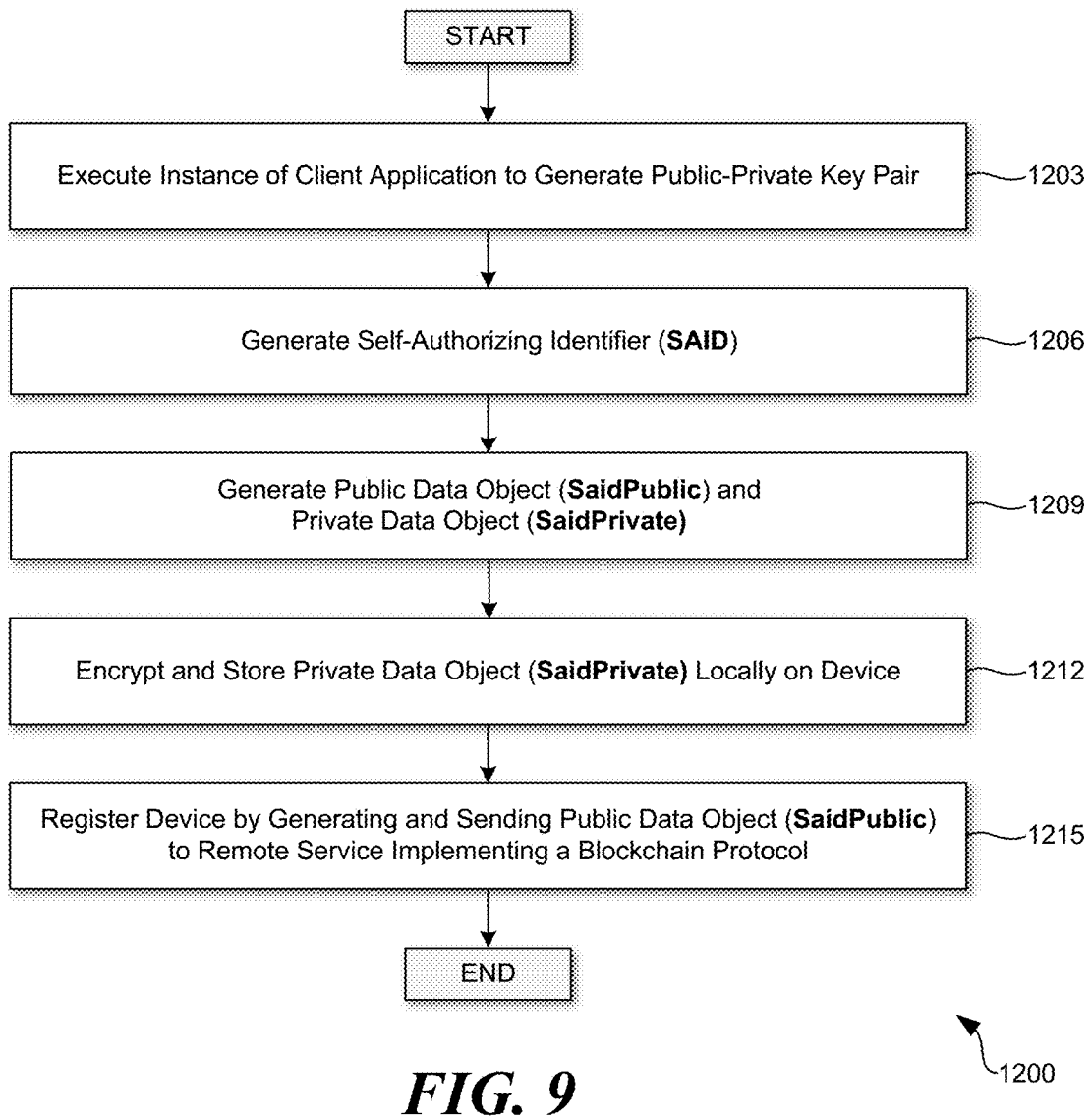
FIGS. 9 and 10 are flowcharts depicting example operations of the DSI networked environment according to various embodiments of the present disclosure.

Referring next to FIG. 9, a flowchart 1200 is shown that provides one example of the operation of a portion of the components of the DSI networked environment 100 of FIG. 2 according to various embodiments. It is understood that the flowchart of FIG. 9 provides merely an example of the many different types of functional arrangements that may be employed to implement the operation of the portion of the components of the DSI networked environment 100 as described herein. As an alternative, the flowchart of FIG. 9 may be viewed as depicting an example of elements of a method implemented in the computing environment 103 according to one or more embodiments.

Beginning with 1203, various instances of a client application, such as the SAID client application 115 described herein, may be downloaded, sideloaded, or otherwise executed on client devices 106 in the DSI networked environment 100, for example, to generate a public-private key pair for each of the client devices 106. For instance, a first client device 106a may download and execute a first instance of the SAID client application 115 to generate a public-private key pair for the first client device 106a, a second client device 106b may execute a second instance of the SAID client application 115 to generate a public-private key pair for the second client device 106b, and so forth. In some embodiments, the public-private key pair generated for a client device 106 is unique to the client device 106.

In 1206, the SAID client application 115 may generate a SAID 125 that is globally unique and immutable to the client device 106 (or other computing device), and/or the SAID client application 115 executing on the client device 106. As detailed above, the SAID 125 may be generated as a function of the public key of the public-private key pair generated in 1203. In some embodiments, the SAID client application 115 may generate multiple public-private key pairs and the SAID 125 may thus be generated as a function of a first-generated public key (e.g., an oldest public key). For instance, in some embodiments, the SAID 125 is a byte string generated using a hash function. The hash function may be executed to generate the SAID 125 as a hash of at least the first public key of the public-private key pair such that the SAID 125 as generated is globally unique and immutable.

Next, in 1209, the SAID client application 115 may generate a public data object SaidPublic and a private data object SaidPrivate based on the public-private key pair. For instance, the public data object SaidPublic may include the public key of the public-key pair, and the private data object SaidPrivate may include the private key of the public-key pair.

To this end, in various embodiments, the public data object SaidPublic as generated may include one or more of the SAID 125 (e.g., a hash value of the first public key); the public key as a first one of a multitude of public keys; a public-private key algorithm used to generate at least one of the public keys; a time at which the public data object SaidPublic was generated; a hash value configured to verify at least one of the public keys generated after the first one of the public keys; an indication of whether an originator of the SAID 125 is a real persona or a virtual persona; an indication of whether the originator of the SAID 125 has terminated the self-authorizing identifier; and a digital digest signed by the private key. In instances in which the originator of the SAID 125 is a virtual persona (as opposed to a real persona), the public data object SaidPublic may further include at least one computing capability and at least one communication capability of the client device 106 or other computing device.

Additionally, in some embodiments, the private data object SaidPrivate as generated may include one or more of: the public-private key pair comprising the public key and the private key; a key version of the public-private key pair; a public key method corresponding to at least the first one of the public keys; an upgrade secret for use to upgrade the public-private key pair; and a time of creation of the public-private key pair or the SAID 125.

In 1212, the SAID client application 115 may encrypt and/or store the private key locally on the client device 106. In some embodiments, the SAID client application 115 includes an actallet 156 configured to protect inner resources from being directly accessed by an orchestrator, DApps 153, CollApps 162, and so forth. In some embodiments, the actallet 156 may protect the private data object (SaidPrivate) in a special file, referred to as a keybox file. In further embodiments, the keybox file may be encrypted by an owner-provided password and device signature. As such, only the owner designated persona of a DSI persona device can open or access the keybox file.

In 1215, the SAID client application 115 or other service of a client device 106 may generate and send a request to register the client device 106 with the computing environment 103 or, in other words, registering the client device 106 with a remote service by sending a suitable request including the public data object SaidPublic comprising the SAID 125. In some embodiments, registration may include registering the client device 106 with a public ledger service (e.g., a blockchain service 112) implementing a predefined storage protocol (e.g., a blockchain protocol) by storing the public data object SaidPublic and/or the public key generated in 1203 in a distributed ledger, such as a distributed blockchain ledger 113. Thereafter, the process may proceed to completion.

In some embodiments, a client device 106 may upgrade its public-private key, including key algorithm and size as new public-private key encryption schemes become available, for example. As such, upon a request and an authentication of a client device 106, the blockchain service 112 may update information associated with the client device 106 in the distributed blockchain ledger 113 to include the upgraded public-private key. It is understood, however, that the SAID 125 remains the hash or other digest of the first-generated public key.

Further, to authenticate a first client device 106a, for example, it is understood that a second client device 106b queries the blockchain service 112 to access the public data object SaidPublic corresponding to the first client device 106a which may be compared to information received from the first client device 106a (e.g., a comparison of a SAID 125 received from the first client device 106a with a SAID 125 retrieved from the blockchain service 112). Also, the second client device 106b can encrypt annexes 190 to be sent to the first client device 106a using the public key of the first client device 106a. Ultimately, an operator of the second client device 106b can determine whether to trust the first client device 106a, for instance, through a trust negotiation process described herein.

Figure 10:
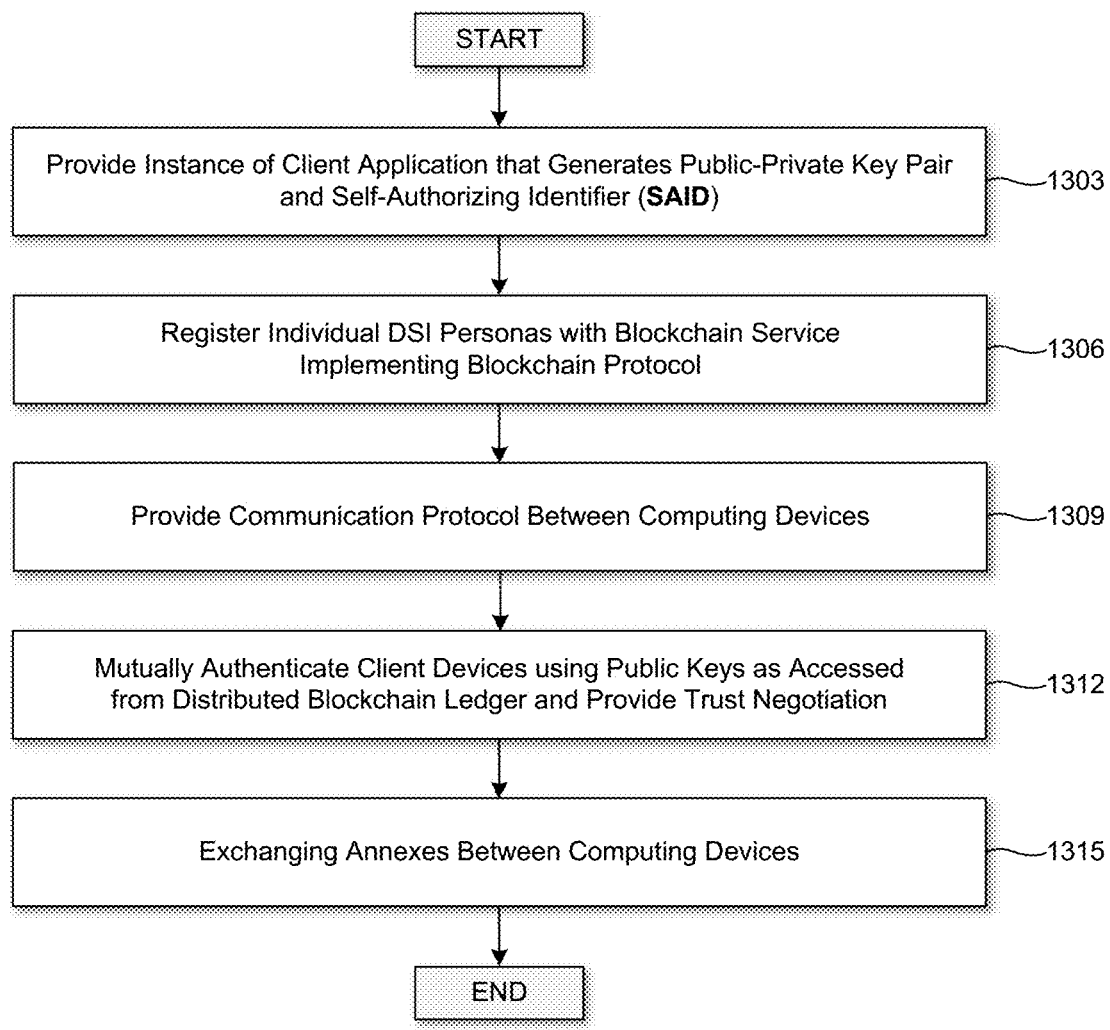

Turning now to FIG. 10, a flowchart 1300 is shown that provides one example of the operation of a portion of the components of the DSI networked environment 100 of FIG. 2 according to various embodiments. It is understood that the flowchart of FIG. 10 provides merely an example of the many different types of functional arrangements that may be employed to implement the operation of the portion of the components of the DSI networked environment 100 as described herein. As an alternative, the flowchart of FIG. 10 may be viewed as depicting an example of elements of a method implemented in the computing environment 103 according to one or more embodiments.

Beginning with 1303, individual instances of a client application, such as the SAID client application 115 may be provided to client devices 106 over a network that generates a public-private key pair comprising a public key and a private key, and generates a SAID 125 associated with the public-private key pair that is globally unique and immutable to respective ones of the client devices 106. Detailed discussion regarding these processes were described above with respect to at least FIG. 9 and will not be repeated herein for brevity.

Next, in 1306, individual ones of the client devices 106 may be registered with a remote service implementing a predefined data storage protocol, such as the blockchain service 112 implementing a blockchain protocol, by storing the public data object SaidPublic (e.g., comprising the public key) generated for each of the client devices 106 in a distributed blockchain ledger 113. Detailed discussion regarding these processes were described above with respect to at least FIG. 9 and will not be repeated herein for brevity.

In 1309, a communication protocol may be provided between individual ones of the client devices 106 that utilizes the public data object SaidPublic, the private data object SaidPrivate, and/or the SAID 125. In some embodiments, as shown in 1312, a client device 106 or other computing device may act as an intermediary and mutually authenticate at least two of the client devices 106 using the public key generated for respective ones of the client devices 106, where the public key may be accessed from the distributed blockchain ledger 113. Further, as shown in 1312, a client device 106 may permit the client devices 106 to negotiate trust.

Finally, in 1315, a client device 106 may exchange annexes 190 between at least two of the client devices 106 to communicate between one another. In some embodiments, exchanging annexes 190 between the two client devices 106 includes establishing one of a permanent connection or a non-permanent connection between the two client devices 106. Thereafter, the process may proceed to completion.

Figure 11:
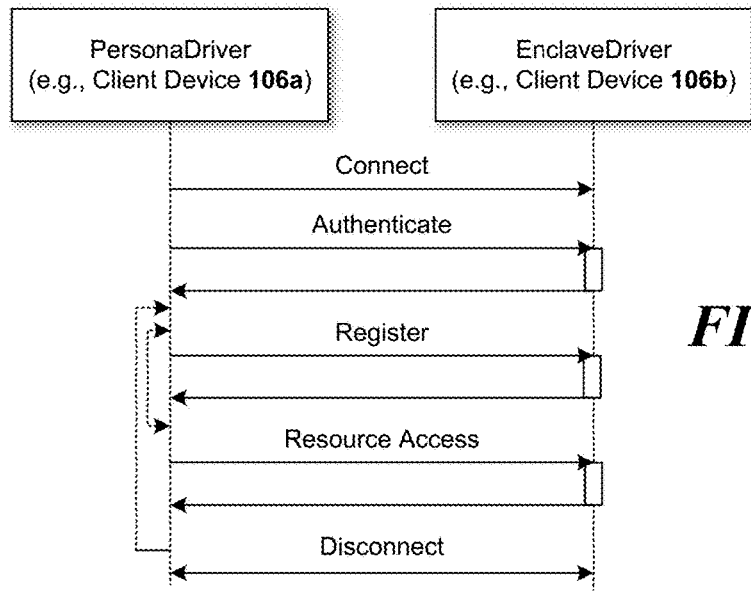
FIG. 11 is an example sequence diagram illustrating a DSI enclave (DSIe) communication protocol according to various embodiments of the present disclosure.
Figure 12:
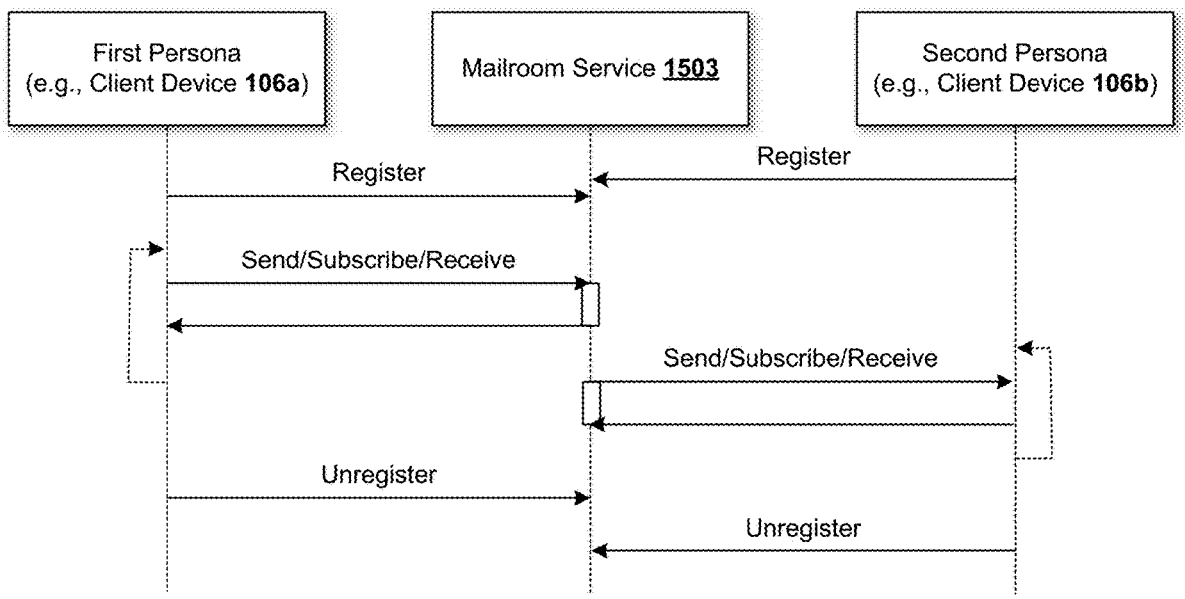
FIG. 12 is an example sequence diagram illustrating a DSI message (DSIm) communication protocol according to various embodiments of the present disclosure.

Referring to FIGS. 11 and 12, different types of communication protocols for client devices 106 to communicate among one another in the DSI networked environment 100 are described according to various embodiments. As mentioned above, the DSI networked environment 100 is a network (e.g., an Internet) of DSI personas. Unlike networks today that connect anonymous and stateless endpoints, the DSI networked environment 100 may inter-relate named and stateful DSI personas. In various embodiments, DSI communication protocols mutually authenticate two communicating DSI personas (e.g., two client devices 106), allow two communicating DSI personas to negotiate trusts, and exchange annexes 190 with or without permanent connections. Specifically, FIG. 11 shows a DSI enclave (DSIe) communication protocol, and FIG. 12 shows a DSI message (DSIm) communication protocol.

Referring first to FIG. 11 and the DSIe protocol, in some embodiments, the DSIe communication protocol may include an asymmetric data sharing protocol that allows a DSI persona to share data with an enclave 187. To this end, the DSIe protocol may have an asymmetric characteristic as only DSI personas can send requests to an enclave 187. The DSIe protocol may also have a synchronous characteristic requiring the enclave 187 to respond to a DSI persona. The DSIe protocol includes mutual authentication, requiring both the DSI persona and the enclave 187 to authenticate one another (e.g., using a public data object SaidPublic and/or the SAID 125). Additionally, a DSI persona must register with the enclave 187 before it may access resources of the enclave 187. The DSIe communication protocol may automatically encrypt and decrypt messages.

To this end, a PersonaDriver (e.g., a first client device 106a) may interact with an enclave 187 (e.g., an EnclaveDriver of a second client device 106b) to connect with the enclave 187, be authenticated by the enclave 187, register with the enclave 187, access resources of the enclave 187, and disconnect from the enclave 187. In some embodiments, the enclave 187 may include an open port with a slow authentication (e.g., one day), thereby preventing DdoS attacks. A DSI persona needs only to know which enclave 187 where it wishes to send the request. The DSIe resolves where the enclave is located. Like phone systems, senders do not need to know where receivers are located. Senders must first register with receivers via the enclave 187, and receivers will not "answer calls" (receive messages from) from unregistered senders.

Referring next to FIG. 12, on the other hand, the DSIm enclave protocol includes an asynchronous message forwarding protocol. In other words, a mailroom enclave service 1503 is a type of enclave 187 that forwards a message from a DSI persona (e.g., a client device 106) to another. In some embodiments, the DSIm has an asynchronous characteristic, requiring both senders and receivers that can be online or offline at any time. Similar to DSIe, the DSIm protocol may perform mutual authentication, and the mailroom enclave service 1503 may mutually authenticate senders and receivers. Further, in some embodiments, the sender and the receiver may mutually authenticate each other. Authentication may include receiving the public data object SaidPublic for each communicating device as well as receiving self-claimed statement data objects SelfClaim having a claim regarding an identity of a respective one of the computing devices. As may be appreciated, the mailroom enclave service 1503 may determine whether to authenticate a client device 106 based at least in part on the public data object SaidPublic and/or the self-claimed statement data objects corresponding thereto. In some embodiments, the self-claimed statement data objects may be signed by another one of the client devices 106 to enhance trust, as may be appreciated.

Also similar to DSIe, the DSIm protocol may include a registration such that a receiver can receive messages from a sender only if it subscribes to the sender. In some embodiments, only the receiver can decrypt a message using, for example, a public key of a sender, where the message was encrypted by the sender using its private key. Further, in some embodiments, messages are not traceable and thus, no one can positively identify receivers.

With respect to DSIm, a DSI persona needs to have two pieces of information, for example, before sending a message to another DSI persona, namely, the SAID 125 of the receiver and the SAID 125 of the client device 106 on which the mailroom enclave service 1503 executes. The mailroom enclave service 1503 executes in an enclave 187 that supports the DSIm protocol. A sender (e.g., a first client device 106a) sends a message to the mailroom enclave service 1503, and the receiver (e.g., a second client device 106b) retrieves the message from the mailroom enclave service 1503. The DSIm resolves where the receiver and the mailroom are located. The senders must first register with receivers, and receivers will not retrieve messages from unregistered senders.

In some embodiments, the DSIm protocol does not permit broadcasting messages, but can instead send messages to predefined message groups. A group administrator, for example, may send a message periodically to each group member, where the message may include a group identifier, administrators, group members, and encryption keys. Individual members determine whether to subscribe to a group and/or the group members. If a DSI persona does not subscribe to a group, it will not receive the group message. If a DSI persona does not subscribe to a group member, it will not receive any messages sent by that group member.

Figure 13:
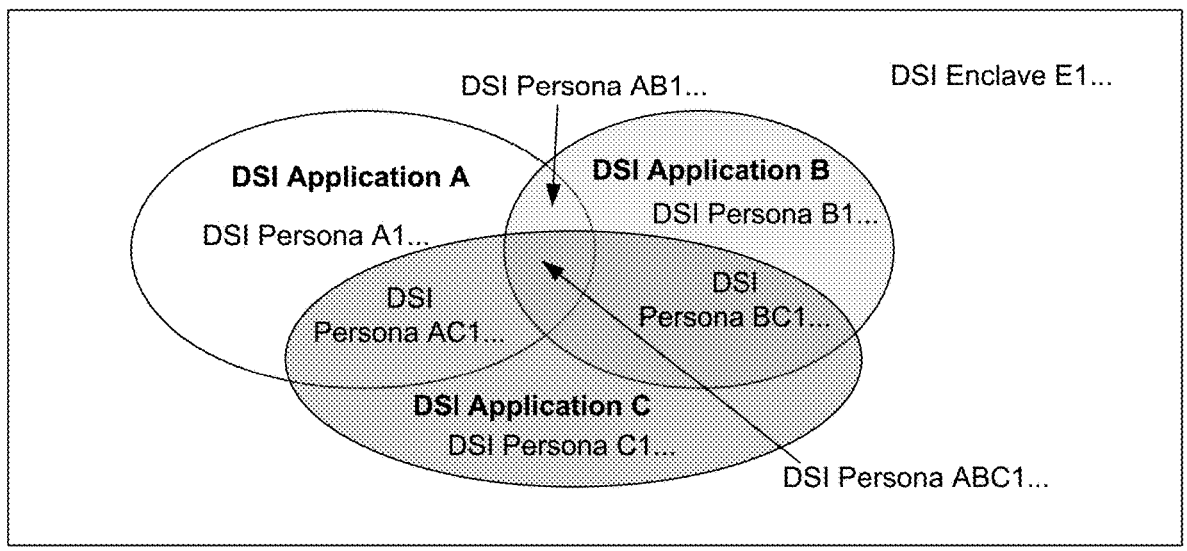
FIG. 13 is an example of communication between various personas occurring in a DSI enclave according to various embodiments of the present disclosure.

FIG. 13 is an example of a DSI application integration architecture according to various embodiments. DSIm includes a persona-to-persona (e.g., client device 106 to client device 106) asynchronous communication protocol, whereas DSIe is a persona-to-enclave synchronous communication protocol. As such, the client devices 115 are shown executing DSI persona applications, which may be the SAID client applications 115 in some examples. Similarly, a client device 106b or a computing environment 103 may include a DSI enclave application executing thereon that implements an enclave 187 as described herein. FIG. 13 illustrates that DSI persona applications are not isolated applications and, instead, can seamlessly integrate with each other.

Figure 14:
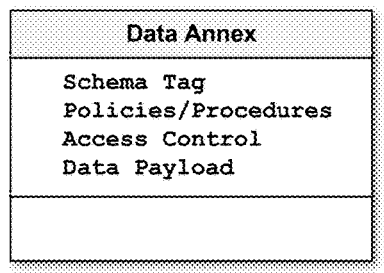
FIG. 14 is a schematic diagram of an example of a data annex according to various embodiments of the present disclosure.
Figure 15:
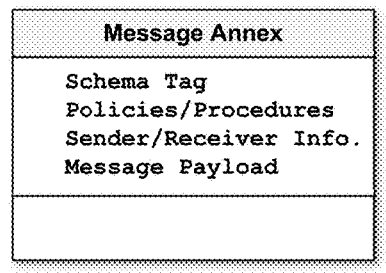
FIG. 15 is a schematic block diagram of an example of a message annex according to various embodiments of the present disclosure.

Referring now to FIGS. 14 and 15, schematic diagrams showing examples of annexes are shown according to various embodiments. Specifically, FIG. 14 shows a data annex and FIG. 15 shows a message annex. As noted above, annexes are self-protected data objects generated by a client device 106 and transmitted over the DSI networked environment 100. Data annexes may be an annex for DSI data sharing. As such, data annexes may include data objects or DSI data assets (DasSets) intended for data sharing by a sender computing device, whereas message annexes may include data objects for asynchronous messaging. In some embodiments, only owner-designed readers can decrypt a data annex, and only the receiver (e.g., a receiver computing device) can decrypt a message annex.

DSI may require protocol buffer data serialization with a schema tag of an annex as a first data field. For instance, a public data object may include a DsiBuf field, which is a DSI data representation standard. In some embodiments, the DsiBuf field may include an identifier corresponding to the Google® protocol buffer serialized DSI data. All devices in the DSI networked environment 100 may parse a DasSet without needing to know or interpret the data. As an annex may include a SAID-protected DasSet, the annex may specify who can access the data, how to manage the data, what the data is, and how to obtain the data. Because annexes are self-secure, annexes can be shared by anyone, anywhere, i.e., on-premise, on-transportation, on-cloud, publicly or privately. As shown in FIG. 15, an annex includes a schema tag, for instance, as a first and required field that tells the receiving client device 106 to parse the annex, a policedure payload that includes data policies and procedures the data handlers should follow, an access control specifying who can access the data, and a data payload, which includes actual data, which may be a data link (e.g., a URI to data), referred to as a DataUri. In some embodiments, the DataUri may include a globally unique (and unguessable) string of a predetermined number of bytes (e.g., a 20-bytes string).

Figure 16:
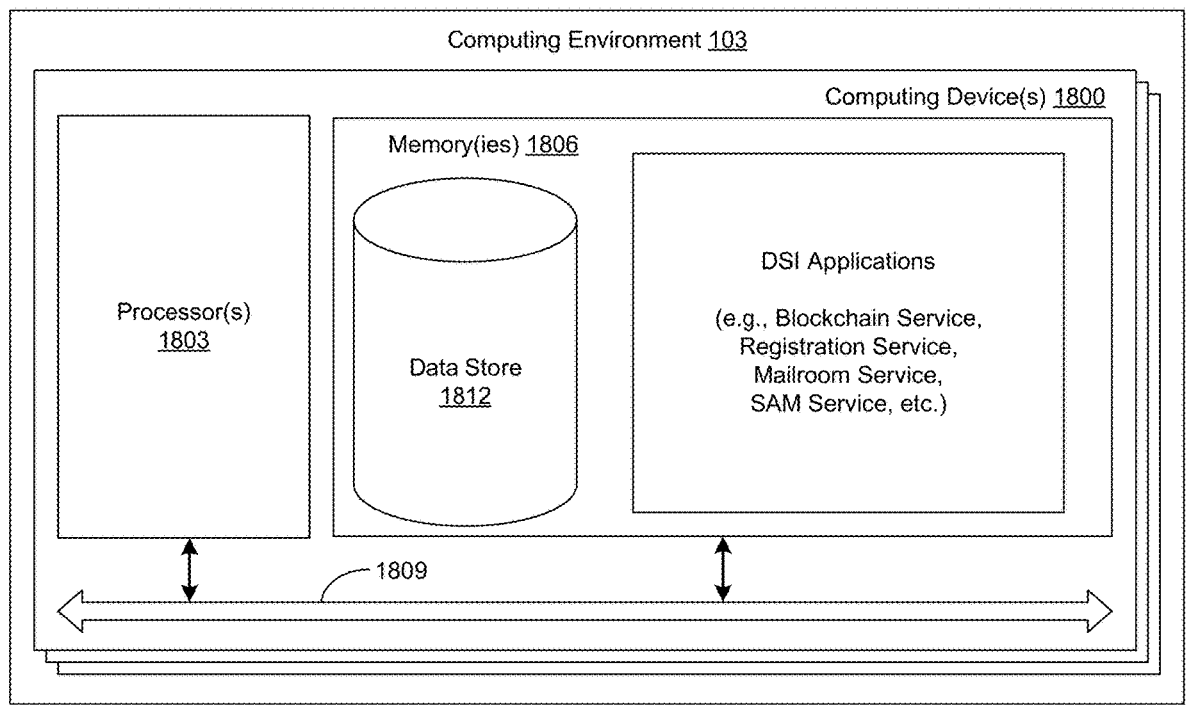
FIG. 16 is an example of a computing environment employed in the DSI networked environment according to various embodiments of the present disclosure.

With reference to FIG. 16, shown is a schematic block diagram of the computing environment 103 according to an embodiment of the present disclosure. The computing environment 103 includes one or more computing devices 1800. Each computing device 1800 includes at least one processor circuit, for example, having a processor 1803 and a memory 1806, both of which are coupled to a local interface 1809. To this end, each computing device 1800 may comprise, for example, at least one server computer or like device. The local interface 1809 may comprise, for example, a data bus with an accompanying address/control bus or other bus structure as can be appreciated.

Stored in the memory 1806 are both data and several components that are executable by the processor 1803. In particular, stored in the memory 1806 and executable by the processor 1803 are the blockchain service 112, and potentially other applications. Also stored in the memory 1806 may be a data store 1812 and other data. In addition, an operating system may be stored in the memory 1806 and executable by the processor 1803.

It is understood that there may be other applications that are stored in the memory 1806 and are executable by the processor 1803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, Go™, Rust™, or other programming languages.

A number of software components are stored in the memory 1806 and are executable by the processor 1803. In this respect, the term "executable" means a program file that is in a form that can ultimately be run by the processor 1803. Examples of executable programs may be, for example, a compiled program that can be translated into machine code in a format that can be loaded into a random access portion of the memory 1806 and run by the processor 1803, source code that may be expressed in proper format such as object code that is capable of being loaded into a random access portion of the memory 1806 and executed by the processor 1803, or source code that may be interpreted by another executable program to generate instructions in a random access portion of the memory 1806 to be executed by the processor 1803, etc. An executable program may be stored in any portion or component of the memory 1806 including, for example, random access memory (RAM), read-only memory (ROM), hard drive, solid-state drive, universal serial bus (USB) flash drive, memory card, optical disc such as compact disc (CD) or digital versatile disc (DVD), floppy disk, magnetic tape, or other memory components.

The memory 1806 is defined herein as including both volatile and nonvolatile memory and data storage components. Volatile components are those that do not retain data values upon loss of power. Nonvolatile components are those that retain data upon a loss of power. Thus, the memory 1806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1803 may represent multiple processors 1803 and/or multiple processor cores and the memory 1806 may represent multiple memories 1806 that operate in parallel processing circuits, respectively. In such a case, the local interface 1809 may be an appropriate network that facilitates communication between any two of the multiple processors 1803, between any processor 1803 and any of the memories 1806, or between any two of the memories 1806, etc. The local interface 1809 may comprise additional systems designed to coordinate this communication, including, for example, performing load balancing. The processor 1803 may be of electrical or of some other available construction.

Although the services, applications, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 9 and 10 show the functionality and operation of an implementation of portions of the DSI networked environment 100. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1803 in a computer system or other system. The machine code may be converted from the source code, etc. If embodied in hardware, each block may represent a circuit or a number of interconnected circuits to implement the specified logical function(s).

Although the flowcharts of FIGS. 9 and 10 show a specific order of execution, it is understood that the order of execution may differ from that which is depicted. For example, the order of execution of two or more blocks may be scrambled relative to the order shown. Also, two or more blocks shown in succession in FIGS. 9 and 10 may be executed concurrently or with partial concurrence. Further, in some embodiments, one or more of the blocks shown in FIGS. 9 and 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic, service, or application described herein that comprises software or code can be embodied in any non-transitory computer-readable medium for use by or in connection with an instruction execution system such as, for example, a processor 1803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic, service, or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1800, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

FIGS. 17-21 are tables illustrating example terminology used herein according to various embodiments of the present disclosure. It is understood that if language used herein refers to multiple items, such multiple items may be recognized as having a first item, a second item, a third item, and so forth to the extent applicable. For example, with respect to there being multiple Dapps 153 executing in an isolated environment (e.g., the DSI persona environment 128), there may be a first Dapp 153, a second Dapp 153, a third Dapp 153, and so forth. In another example, with respect to there being multiple client devices 106 communicating in the networked environment 100, there may be a first client device 106, a second client device 106, a third client device 106, and so forth. As various embodiments are described herein, it is understood that aspects of one embodiment may be combined with another so long as the combination of such does not create a conflict.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Clause 1. A system, comprising: a computing device comprising at least one hardware processor; and memory comprising program instructions stored thereon that are executable by the computing device that, when executed, direct the computing device to: execute an instance of a client application on the computing device to generate a public-private key pair comprising a public key and a private key; generate a self-authorizing identifier (SAID) that is globally unique and immutable to the computing device and the client application executing on the computing device, wherein the SAID is generated as a function of at least the public key; encrypt and store the private key locally on the computing device; generate a request to register the computing device with a remote service that stores the public key in a distributed ledger; and send the request to the remote service that directs the remote service to store the public key in the distributed ledger.

Clause 2. The system according to clause 1, wherein: the self-authorizing identifier is a byte string generated using a hash function, wherein the hash function is executed to generate the self-authorizing identifier as a hash of at least the public key of the public-private key pair such that the self-authorizing identifier as generated is globally unique and immutable.

Clause 3. The system according to any of clauses 1-2, wherein the at least one computing device is further directed to: generate a private data object (SaidPrivate) corresponding to the self-authorizing identifier; and generate a public data object (SaidPublic) corresponding to the self-authorizing identifier; wherein the request to register the computing device with the remote service comprises the public data object.

Clause 4. The system according to any of clauses 1-3, wherein the public data object as generated comprises: the self-authorizing identifier; the public key as a first one of a plurality of public keys; a public-private key algorithm used to generate at least one of the plurality of public keys; a time at which the public data object was generated; a hash value configured to verify at least one of the plurality of public keys generated after the first one of the plurality of public keys; an indication of whether an originator of the self-authorizing identifier is a real persona or a virtual persona; an indication of whether the originator of the self-authorizing identifier has terminated the self-authorizing identifier; and a digital digest signed by the private key.

Clause 5. The system according to any of clauses 1-4, wherein the private data object as generated comprises: the public-private key pair comprising the public key and the private key; a key version of the public-private key pair; a public key size and an encryption key method corresponding to at least the first one of the plurality of public keys; an upgrade secret for use to upgrade the public-private key pair; and a time of creation of the public-private key pair or the self-authorizing identifier.

Clause 6. The system according to any of clauses 1-5, wherein: the indication of whether the originator of the self-authorizing identifier is the real persona or the virtual persona indicates that the originator is the virtual persona; and in an instance in which the originator is the virtual persona, the public data object further comprises at least one computing capability and at least one communication capability of the computing device.

Clause 7. The system according to any of clauses 1-6, wherein: the remote service is a remote blockchain service; the distributed ledger is a distributed blockchain ledger; the computing device is a first one of a plurality of computing devices in the system and the first of the plurality of computing devices is further directed to: access a message received from a second one of the plurality of computing devices, the message being encrypted by the second of the plurality of computing devices using a private key of the second one of the plurality of computing devices; retrieve a public key of the second one of the plurality of computing devices from the distributed blockchain ledger via the blockchain service; and decrypt the message using the public key and display contents of the message on the client device.

Clause 8. The system according to any of clauses 1-7, wherein: the client application comprises an orchestrator that generates the public-private key pair and the self-authorizing identifier, and controls operation thereof; and the client application further comprises an actallet that encrypts, stores, and controls access to the private data object sorted locally in the memory of the computing device.

Clause 9. The system according to any of clauses 1-8, wherein: the client application is executed in an isolated environment on the computing device; the computing device comprises at least one distributed application stored in the memory having a globally unique distributed application identifier configured to execute in the isolated environment, the at least one distributed application configured to interact with the orchestrator through an application programming interface (API) call to perform at least one of: encrypting or decrypting data using the public data object or the private data object stored in the memory of the computing device; accessing a profile associated with the client application; accessing a calendar associated with the client application; accessing a folder maintained by the client application; and accessing a contact of a contact list associated with the client application.

Clause 10. The system according to any of clauses 1-9, wherein: the client application is executed in an isolated environment on the computing device; the computing device comprises at least one collaboration application stored in the memory having a globally unique collaboration application identifier configured to execute outside of the isolated environment, the at least one collaboration application configured to interact with the orchestrator through an application programming interface (API) call to perform at least one of: encrypting or decrypting data using the public data object or the private data object stored in the memory of the computing device; accessing a profile associated with the client application; accessing a calendar associated with the client application; accessing a folder maintained by the client application; and accessing a contact of a contact list associated with the client application.

Clause 11. A method, comprising: providing an instance of a client application to a plurality of computing devices over a network that generates a public-private key pair comprising a public key and a private key, and generates a self-authorizing identifier (SAID) associated with the public-private key pair that is globally unique and immutable to respective ones of the computing devices; registering individual ones of the computing devices with a registration service implementing a predefined storage protocol by storing the public key generated for each of the computing devices in a distributed ledger; and providing a communication protocol between individual ones of the computing devices by mutually authenticating at least two ones of the computing devices using at least one of the public key and the SAID generated for each of the computing devices accessed from the distributed ledger, permitting the at least two ones of the computing devices to negotiate trust; and exchanging annexes between the at least two ones of the computing devices to communicate between one another.

Clause 12. The method according to clause 11, wherein exchanging the annexes between the at least two ones of the computing devices comprises establishing one of a permanent or a non-permanent connection between the at least two ones of the computing devices.

Clause 13. The method according to any of clauses 11-12, wherein the communication protocol as provided is an asymmetric data sharing protocol, comprising: providing an enclave service on at least one of the computing devices that determines whether to permit incoming connections with other ones of the computing devices based on a trust negotiation with the other ones of the computing devices; receiving, by the enclave service, a request to store the annexes from individual ones of the computing devices that are permitted by the enclave service for the incoming connections, the annexes comprising a data or message payload and being digitally signed; receiving, by the enclave service, a request to pull at least one of the annexes from at least one of the computing devices; authorizing, by the enclave service, the request to pull the at least one of the annexes from at least one of the computing devices based at least in part on the public key associated with the self-authorizing identifier (SAID) stored for the at least one of the computing device accessed from the distributed ledger; and in an instance in which the request to pull has been authorized, permitting the pull of at least one of the annexes by the at least one of the computing devices.

Clause 14. The method according to any of clauses 11-13, wherein the communication protocol as provided is an asynchronous message forwarding protocol, comprising: providing a mailroom service on at least one of the computing devices that performs a mutually authentication of the at least two ones of the computing devices comprising a sending computing device and a receiving computing device; in response to receipt of a request from the receiving computing device, registering, by the mailroom service, the receiving computing device and the sending computing device; and in an instance in which the receiving computing device and the sending computing device are registered with the mailroom service, asynchronously exchanging the annexes between the receiving computing device and the sending computing device, wherein the annexes are encrypted by the sending computing device and decrypted by the receiving computing device.

Clause 15. The method according to any of clauses 11-14, wherein: on the computing devices not associated with the enclave service, the client application prohibits any incoming connections on the respective one of the computing devices by blocking a plurality of ports on the respective one of the computing devices; and the self-authorizing identifier is a byte string generated using a hash function, wherein the hash function is executed to generate the self-authorizing identifier as a hash of at least the public key of the public-private key pair such that the self-authorizing identifier as generated is globally unique and immutable.

Clause 16. The method according to any of clauses 11-15, further comprising: generating, by the individual ones of the computing devices, a private data object (SaidPrivate) corresponding to the self-authorizing identifier; encrypting and storing, by the individual ones of the computing devices, the private data object locally on the individual ones of the computing devices; and generating, by the individual ones of the computing devices, a public data object (SaidPublic) corresponding to the self-authorizing identifier; wherein the predefined storage protocol is a blockchain protocol, the remote service is a blockchain service, and the distributed ledger is a distributed blockchain ledger; and wherein registering the individual ones of the computing devices with the blockchain service comprises storing the public data object generated by the individual ones of the computing devices in the distributed blockchain ledger.

Clause 17. The method according to any of clauses 11-16, wherein: at least one of the annexes comprises logic to be executed by the enclave service; and the method further comprises, upon receipt of the at least one of the annexes, calling, by the enclave service, a smart annex management service to execute the logic in the at least one of the annexes.

Clause 18. The method according to any of clauses 11-17, wherein: the at least one of the annexes comprises a plurality of self-authorizing identifiers; a first one of the self-authorizing identifiers in the at least one of the annexes corresponds to an intended recipient of the at least one of the annexes; and a second one of the self-authorizing identifiers in the at least one of the annexes corresponds to the enclave service.

Clause 19. The method according to any of clauses 11-18, further comprising: registering, by the enclave service, a subset of the computing devices with a group, the group being associated with a group identifier, at least one administrator, a plurality of group members, and at least one encryption key; and establishing, by the enclave service, a connection with one of the computing devices and permitting the one of the computing devices to receive one of the annexes in response to the one of the computing device being associated with the group.

Clause 20. The method according to any of clauses 11-19, further comprising: receiving the public data object from each of the computing devices; and receiving a plurality of self-claimed statement data objects (SelfClaim) having a claim regarding an identity of a respective one of the computing devices, wherein at least a portion of the self-claimed statement data objects are signed by another one of the computing devices.

Clause 21. A method, comprising: executing, by a computing device comprising at least one hardware processor, a client application in an isolated environment on the computing device that generates a public-private key pair comprising a public key and a private key; generating, by the computing device, a self-authorizing identifier (SAID) that is globally unique and immutable to the computing device and the client application executing on the computing device, wherein the SAID is generated as a function of at least the public key; sending, by the computing device, a request to register the computing device to a remote service over a network that directs the remote service implementing a predefined storage protocol to store the self-authorizing identifier and the public key in a distributed ledger; storing, by the computing device, the public key and the private key locally on the computing device; executing, by the computing device, a distributed application in the isolated environment such that the distributed application is permitted to access the private key and the public key stored in the memory of the computing device to verify an identity of the client device or an end user of the client device; and executing, by the computing device, a collaboration application outside of the isolated environment such that the collaboration application is not able to access the private key and the public key stored in the memory of the computing device.

Clause 22. The method according to clause 21, further comprising implementing a service representative architecture (SRA) by: receiving a confirmation by an owner of a self-authorizing identifier to trust and obtain at least one service of a first instance of a service provider application executing locally on the computing device that communicates with a second instance of the service provider application executing remotely on another computing device; generating and assigning a dedicated representative for the service provider application, the dedicated representative being a virtual service executing locally on the computing device capable of communicating with the second instance of the service provider application executing remotely on the other computing device; and establishing a trust relationship between the dedicated representative and the computing device such that, when future requests from the dedicated representative are received, the computing device automatically responds to the request and provides requested information.

Clause 23. The method according to any of clauses 21-22, wherein: the computing device is a first one of a plurality of computing devices in a networked environment; the method further comprises: executing, by a second one of the computing devices, a root service that acts an authority root on behalf of computing devices communicating in the networked environment; and generating and sending, by the root service, a certificate for at least the remote service to the remote service based at least in part on a second self-authorizing identifier corresponding to the remote service retrieved from the distributed ledger; and generating and sending, by the root service, a certificate for at least one of the computing devices in the networked environment based at least in part on the self-authorizing identifier corresponding to the at least one of the computing devices retrieved from the distributed ledger.

Clause 24. The method according to any of clauses 21-23, wherein: the remote service is a remote blockchain service, and the distributed ledger is a distributed blockchain ledger; the computing device is a first one of a plurality of computing devices in a networked environment; and the method further comprises: executing, by a second one of the computing devices, a registration service that maintains a service directory comprising a list of the computing devices registered with the blockchain service; in response to receipt of a search request, searching, by the second one of the computing devices, the service directory for a particular one of the computing devices; and sending, by the second one of the computing devices, a search result to a corresponding one of the computing devices that generated the search request.

Clause 25. The method according to any of clauses 21-24, further comprising: the computing device is a first one of a plurality of computing devices in a networked environment; and executing, by a second one of the computing devices, a storage service that stores annexes received from at least a portion of the computing devices in the networked environment, the computing devices being registered with the registration service.

Clause 26. The method according to any of clauses 21-25, wherein: the self-authorizing identifier is a byte string generated using a hash function, wherein the hash function is executed to generate the self-authorizing identifier as a hash of at least the public key of the public-private key pair such that the self-authorizing identifier as generated is globally unique and immutable.

Clause 27. The method according to any of clauses 21-26, further comprising: generating, by the computing device, a private data object (SaidPrivate) corresponding to the self-authorizing identifier comprising the public key and the self-authorizing identifier; generating, by the computing device, a public data object (SaidPublic) corresponding to the self-authorizing identifier comprising the private key; and wherein the request to register the computing device with the registration service comprises the public data object.

Clause 28. The method according to any of clauses 21-27, further comprising: the computing device is a first one of a plurality of computing devices in a networked environment; and the method further comprises: receiving, by a second one of the computing devices, a request to backup a persona environment executing on the first one of the computing devices; storing, by the second one of the computing devices, the public data object, the private data object, and the self-authorizing identified in a data store; and migrating, by the second one off the computing devices, the public data object, the private data object, and the self-authorizing identifier to a third one of the computing devices upon an authentication of the third one of the computing devices.

Clause 29. The method according to any of clauses 21-28, wherein the public data object as generated comprises: the self-authorizing identifier; the public key as a first one of a plurality of public keys; a hash value configured to verify at least one of the plurality of public keys generated after the first one of the plurality of public keys; an indication of whether an originator of the self-authorizing identifier is a real persona or a virtual persona; and an indication of whether the originator of the self-authorizing identifier has terminated the self-authorizing identifier.

Clause 30. The method according to any of clauses 21-29, wherein the private data object as generated comprises: the public-private key pair comprising the public key and the private key; a key version of the public-private key pair; a public key method corresponding to at least the first one of the plurality of public keys; an upgrade secret for use to upgrade the public-private key pair; and a time of creation of the public-private key pair or the self-authorizing identifier.

Clause 31. The method according to any of clauses 21-30, wherein: the isolated environment is one of a container and a virtual machine; and the isolated environment further comprises an orchestrator service configured to manage or oversee a console and the distributed applications and the collaborating applications, wherein the orchestrator service determines whether to permit individual ones of the distributed applications and the collaborating applications to access a respective application programming interface to retrieve at least one of the self-authorizing identifier and the public data object from local memory of the client device.

Therefore, the following is claimed:

1. A system, comprising:
   a computing device comprising at least one hardware processor; and
   memory comprising program instructions stored thereon that are executable by the computing device that, when executed, direct the computing device to:
   execute an instance of a client application on the computing device to generate a public-private key pair comprising a public key and a private key using a first public-private key encryption scheme;
   generate a self-authorizing identifier (SAID) that is globally unique and immutable to the computing device and the client application executing on the computing device, wherein the self-authorizing identifier is a byte string generated as a hash of the public key using a hash function;
   encrypt and store the private key locally on the computing device;
   generate a request to register the computing device with a remote service that stores the public key in a distributed ledger remotely from the computing device;
   send the request to register the computing device over a network to the remote service that directs the remote service to store the public key in the distributed ledger;
   perform an upgrade of the public-private key pair using a second public-private key encryption scheme different than the first public-private key encryption scheme that generates an upgraded public-private key; and
   send a request to the remote service to store an upgraded public key of the upgraded public-private key in the distributed ledger upon an authentication of the client device, wherein the SAID remains the hash of a first-generated public key.

2. The system according to claim 1, wherein the hash function is executed to generate the self-authorizing identifier such that the self-authorizing identifier as generated is globally unique and immutable.

3. The system according to claim 1, wherein the at least one computing device is further directed to:
   generate a private data object (SaidPrivate) corresponding to the self-authorizing identifier; and
   generate a public data object (SaidPublic) corresponding to the self-authorizing identifier;
   wherein the request to register the computing device with the remote service comprises the public data object.

4. The system according to claim 3, wherein the public data object as generated comprises:
   the self-authorizing identifier;
   the public key as a first one of a plurality of public keys;
   a public-private key algorithm used to generate at least one of the plurality of public keys;
   a time at which the public data object was generated;
   a hash value configured to verify at least one of the plurality of public keys generated after the first one of the plurality of public keys;
   an indication of whether an originator of the self-authorizing identifier is a real persona or a virtual persona;
   an indication of whether the originator of the self-authorizing identifier has terminated the self-authorizing identifier; and
   a digital digest signed by the private key.

5. The system according to claim 4, wherein the private data object as generated comprises:
   the public-private key pair comprising the public key and the private key;
   a key version of the public-private key pair;
   a public key size and an encryption key method corresponding to at least the first one of the plurality of public keys;
   an upgrade secret for use to upgrade the public-private key pair; and
   a time of creation of the public-private key pair or the self-authorizing identifier.

6. The system according to claim 4, wherein:
   the indication of whether the originator of the self-authorizing identifier is the real persona or the virtual persona indicates that the originator is the virtual persona; and
   in an instance in which the originator is the virtual persona, the public data object further comprises at least one computing capability and at least one communication capability of the computing device specifying a size declaration that indicates how fast the computing device can make requests or service requests.

7. The system according to claim 4, wherein:
   the remote service is a remote blockchain service;
   the distributed ledger is a distributed blockchain ledger;
   the computing device is a first one of a plurality of computing devices in the system and the first one of the plurality of computing devices is further directed to:
   close all incoming ports on the computing device;
   access a message received from a second one of the plurality of computing devices, the message being encrypted by the second of the plurality of computing devices using a private key of the second one of the plurality of computing devices;

retrieve a public key of the second one of the plurality of computing devices from the distributed blockchain ledger via the blockchain service; and decrypt the message using the public key and display contents of the message on the client device.

8. The system according to claim 3, wherein:

the client application comprises an orchestrator that generates the public-private key pair and the self-authorizing identifier, and controls operation thereof; and the client application further comprises an actallet that encrypts, stores, and controls access to the private data object sorted locally in the memory of the computing device.

9. The system according to claim 8, wherein:

the client application is executed in an isolated environment on the computing device;

the computing device comprises at least one distributed application stored in the memory having a globally unique distributed application identifier configured to execute in the isolated environment, the at least one distributed application configured to interact with the orchestrator through an application programming interface (API) call to perform at least one of:

encrypting or decrypting data using the public data object or the private data object stored in the memory of the computing device;

accessing a profile associated with the client application;

accessing a calendar associated with the client application;

accessing a folder maintained by the client application; and accessing a contact of a contact list associated with the client application.

10. The system according to claim 8, wherein:

the client application is executed in an isolated environment on the computing device;

the computing device comprises at least one collaboration application stored in the memory having a globally unique collaboration application identifier configured to execute outside of the isolated environment, the at least one collaboration application configured to interact with the orchestrator through an application programming interface (API) call to perform at least one of:

encrypting or decrypting data using the public data object or the private data object stored in the memory of the computing device;

accessing a profile associated with the client application;

accessing a calendar associated with the client application;

accessing a folder maintained by the client application; and accessing a contact of a contact list associated with the client application.

11. A method, comprising:

providing an instance of a client application to a plurality of computing devices over a network that generates a public-private key pair comprising a public key and a private key, generates a self-authorizing identifier (SAID) associated with the public-private key pair that is globally unique and immutable to respective ones of the computing devices, and closes all incoming ports on the respective ones of the computing devices;

registering individual ones of the computing devices with a registration service implementing a predefined storage protocol by storing the public key generated for each of the computing devices in a distributed ledger;

establishing a communication protocol between individual ones of the computing devices by mutually authenticating at least two ones of the computing devices using at least one of the public key and the SAID generated for each of the computing devices accessed from the distributed ledger;

negotiating trust between the at least two ones of the computing devices using information not associated with the self-authorizing identifier exchanged directly between the at least two ones of the computing devices;

in an instance in which trust is not successfully negotiated between the at least two of the computing devices, terminating the communication protocol; and in an instance in which trust is successfully negotiated between the at least two of the computing devices, exchanging annexes between the at least two ones of the computing devices to communicate between one another.

12. The method according to claim 11, wherein exchanging the annexes between the at least two ones of the computing devices comprises:

providing an enclave service in at least a portion of the computing devices configured to establish one of a permanent or a non-permanent connection between the at least two ones of the computing devices and implement the communication protocol, wherein the two ones of the computing devices are configured to pull data from the enclave service while keeping the incoming ports of the two ones of the computing devices closed.

13. The method according to claim 12, wherein the communication protocol as provided is an asymmetric data sharing protocol, comprising:

providing the enclave service on at least the portion of the computing devices that determines whether to permit incoming connections with other ones of the computing devices based on a trust negotiation with a respective instance of the client application executing on the other ones of the computing devices;

receiving, by the enclave service, a request to store the annexes from individual ones of the computing devices that are permitted by the enclave service for the incoming connections, the annexes comprising a data or message payload and being digitally signed;

receiving, by the enclave service, a request to pull at least one of the annexes from at least one of the computing devices;

authorizing, by the enclave service, the request to pull the at least one of the annexes from at least one of the computing devices based at least in part on the public key associated with the self-authorizing identifier (SAID) stored for the at least one of the computing device accessed from the distributed ledger; and in an instance in which the request to pull has been authorized, permitting the pull of at least one of the annexes by the at least one of the computing devices.

14. The method according to claim 12, wherein the communication protocol as provided is an asynchronous message forwarding protocol, comprising:

providing a mailroom enclave service on at least one of the computing devices that performs a mutually authentication of the at least two ones of the computing devices comprising a sending computing device and a receiving computing device;

in response to receipt of a request from the receiving computing device, registering, by the mailroom service, a respective instance of the client application executing on the receiving computing device and a respective instance of the client application executing on the sending computing device; and in an instance in which the receiving computing device and the sending computing device are registered with the mailroom enclave service, asynchronously exchanging the annexes between the receiving computing device and the sending computing device, wherein the annexes are encrypted by the sending computing device and decrypted by the receiving computing device.

15. The method according to claim 11, wherein:
the self-authorizing identifier is a byte string generated using a hash function, wherein the hash function is executed to generate the self-authorizing identifier as a hash of at least the public key of the public-private key pair such that the self-authorizing identifier as generated is globally unique and immutable.

16. The method according to claim 15, further comprising:
generating, by the individual ones of the computing devices, a private data object (SaidPrivate) corresponding to the self-authorizing identifier;
encrypting and storing, by the individual ones of the computing devices, the private data object locally on the individual ones of the computing devices; and
generating, by the individual ones of the computing devices, a public data object (SaidPublic) corresponding to the self-authorizing identifier;
wherein the predefined storage protocol is a blockchain protocol, the remote service is a blockchain service, and the distributed ledger is a distributed blockchain ledger; and
wherein registering the individual ones of the computing devices with the blockchain service comprises storing the public data object generated by the individual ones of the computing devices in the distributed blockchain ledger.

17. The method according to claim 13, wherein:
at least one of the annexes comprises logic to be executed by the enclave service; and
the method further comprises, upon receipt of the at least one of the annexes, calling, by the enclave service, a smart annex management service to execute the logic in the at least one of the annexes.

18. The method according to claim 11, wherein:
the at least one of the annexes comprises a plurality of self-authorizing identifiers;
a first one of the self-authorizing identifiers in the at least one of the annexes corresponds to an intended recipient of the at least one of the annexes; and
a second one of the self-authorizing identifiers in the at least one of the annexes corresponds to the enclave service.

19. The method according to claim 11, further comprising:
registering, by the enclave service, a subset of the computing devices with a group, the group being associated with a group identifier, at least one administrator, a plurality of group members, and at least one encryption key; and
establishing, by the enclave service, a connection with one of the computing devices and permitting the one of the computing devices to receive one of the annexes in response to the one of the computing device being associated with the group.

20. The method according to claim 11, further comprising:
receiving the public data object from each of the computing devices; and
receiving a plurality of self-claimed statement data objects (SelfClaim) having a claim regarding an identity of a respective one of the computing devices, wherein at least a portion of the self-claimed statement data objects are signed by another one of the computing devices.

21. A method, comprising:
executing, by a computing device comprising at least one hardware processor, a client application in an isolated environment on the computing device that generates a public-private key pair comprising a public key and a private key;
generating, by the computing device, a self-authorizing identifier (SAID) that is globally unique and immutable to the computing device and the client application executing on the computing device, wherein the SAID is generated as a function of at least the public key;
sending, by the computing device, a request to register the computing device to a remote service over a network that directs the remote service implementing a predefined storage protocol to store the self-authorizing identifier and the public key in a distributed ledger;
storing, by the computing device, the public key and the private key locally on the computing device, the private key being stored as encrypted;
closing, by the computing device, all incoming ports;
executing, by the computing device, a plurality of distributed applications in the isolated environment on the computing device such that individual ones of the distributed applications are permitted to access the private key and the public key stored in the memory of the computing device through an application programming interface (API) associated with the client application to verify an identity of the client device or an end user of the client device; and
executing, by the computing device, a plurality of collaboration applications outside of the isolated environment on the computing device such that the collaboration applications are not able to access the private key and the public key stored in the memory of the computing device,
wherein the client application is a separate application than the plurality of distributed applications and the plurality of collaboration applications.

22. The method according to claim 21, further comprising implementing a service representative architecture (SRA) by:
receiving a confirmation by an owner of a self-authorizing identifier to trust and obtain at least one service of a first instance of a service provider application executing locally on the computing device that communicates with a second instance of the service provider application executing remotely on another computing device;
generating and assigning a dedicated representative for the service provider application, the dedicated representative being a virtual service executing locally on the computing device capable of communicating with the second instance of the service provider application executing remotely on the other computing device; and establishing a trust relationship between the dedicated representative and the computing device such that, when future requests from the dedicated representative are received, the computing device automatically responds to the request and provides requested information.

23. The method according to claim 21, wherein:

the computing device is a first one of a plurality of computing devices in a networked environment;

the method further comprises:

executing, by a second one of the computing devices, a root service that acts an authority root on behalf of computing devices communicating in the networked environment; and generating and sending, by the root service, a certificate for at least the remote service to the remote service based at least in part on a second self-authorizing identifier corresponding to the remote service retrieved from the distributed ledger; and generating and sending, by the root service, a certificate for at least one of the computing devices in the networked environment based at least in part on the self-authorizing identifier corresponding to the at least one of the computing devices retrieved from the distributed ledger.

24. The method according to claim 21, wherein:

the remote service is a remote blockchain service, and the distributed ledger is a distributed blockchain ledger;

the computing device is a first one of a plurality of computing devices in a networked environment; and the method further comprises:

executing, by a second one of the computing devices, a registration service that maintains a service directory comprising a list of the computing devices registered with the blockchain service;

in response to receipt of a search request, searching, by the second one of the computing devices, the service directory for a particular one of the computing devices; and sending, by the second one of the computing devices, a search result to a corresponding one of the computing devices that generated the search request.

25. The method according to claim 21, further comprising:

the computing device is a first one of a plurality of computing devices in a networked environment; and executing, by a second one of the computing devices, a storage service that stores annexes received from at least a portion of the computing devices in the networked environment, the computing devices being registered with the registration service.

26. The method according to claim 21, wherein:

the self-authorizing identifier is a byte string generated using a hash function, wherein the hash function is executed to generate the self-authorizing identifier as a hash of at least the public key of the public-private key pair such that the self-authorizing identifier as generated is globally unique and immutable.

27. The method according to claim 21, further comprising:

generating, by the computing device, a private data object (SaidPrivate) corresponding to the self-authorizing identifier comprising the public key and the self-authorizing identifier; and generating, by the computing device, a public data object (SaidPublic) corresponding to the self-authorizing identifier comprising the private key;

wherein the request to register the computing device with the registration service comprises the public data object.

28. The method according to claim 27, further comprising:

the computing device is a first one of a plurality of computing devices in a networked environment; and the method further comprises:

receiving, by a second one of the computing devices, a request to backup a persona environment executing on the first one of the computing devices;

storing, by the second one of the computing devices, the public data object, the private data object, and the self-authorizing identified in a data store; and migrating, by the second one off the computing devices, the public data object, the private data object, and the self-authorizing identifier to a third one of the computing devices upon an authentication of the third one of the computing devices.

29. The method according to claim 28, wherein the public data object as generated comprises:

the self-authorizing identifier;

the public key as a first one of a plurality of public keys;

a hash value configured to verify at least one of the plurality of public keys generated after the first one of the plurality of public keys;

an indication of whether an originator of the self-authorizing identifier is a real persona or a virtual persona; and an indication of whether the originator of the self-authorizing identifier has terminated the self-authorizing identifier.

30. The method according to claim 29, wherein the private data object as generated comprises:

the public-private key pair comprising the public key and the private key;

a key version of the public-private key pair;

a public key method corresponding to at least the first one of the plurality of public keys;

an upgrade secret for use to upgrade the public-private key pair; and a time of creation of the public-private key pair or the self-authorizing identifier.

31. The method according to claim 21, wherein:

the isolated environment is one of a container and a virtual machine; and the isolated environment further comprises an orchestrator service configured to manage or oversee a console and the distributed applications and the collaborating applications, wherein the orchestrator service determines whether to permit individual ones of the distributed applications and the collaborating applications to access a respective application programming interface to retrieve at least one of the self-authorizing identifier and the public data object from local memory of the client device.

* * * * *